United States Patent
Takada et al.

(10) Patent No.: US 12,519,983 B2
(45) Date of Patent: Jan. 6, 2026

(54) VIDEO CODING APPARATUS AND VIDEO DECODING APPARATUS

(71) Applicant: SHARP KABUSHIKI KAISHA, Sakai (JP)

(72) Inventors: Keiichiro Takada, Sakai (JP); Tomohiro Ikai, Sakai (JP); Takeshi Chujoh, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/711,062

(22) PCT Filed: Nov. 8, 2022

(86) PCT No.: PCT/JP2022/041490
§ 371 (c)(1),
(2) Date: May 16, 2024

(87) PCT Pub. No.: WO2023/090198
PCT Pub. Date: May 25, 2023

(65) Prior Publication Data
US 2025/0008162 A1  Jan. 2, 2025

(30) Foreign Application Priority Data

Nov. 19, 2021 (JP) .................. 2021-188749

(51) Int. Cl.
*H04N 19/80* (2014.01)
*H04N 19/186* (2014.01)

(52) U.S. Cl.
CPC ........... *H04N 19/80* (2014.11); *H04N 19/186* (2014.11)

(58) Field of Classification Search
CPC .............................. H04N 19/80; H04N 19/186
(Continued)

(56) References Cited

U.S. PATENT DOCUMENTS

| | | | |
|---|---|---|---|
| 2019/0273948 A1 | 9/2019 | Yin et al. | |
| 2022/0224924 A1 | 7/2022 | Li et al. | |
| 2023/0062752 A1* | 3/2023 | Lainema | .............. H04N 19/149 |

FOREIGN PATENT DOCUMENTS

| | | |
|---|---|---|
| WO | 2021/165569 A1 | 8/2021 |
| WO | 2022150075 A1 | 7/2022 |

OTHER PUBLICATIONS

Zhenyu Dai et al., "[AHG11] Neural Network-based Adaptive Model Selection for CNN In-Loop Filtering", Document: JVET-X0126-v2, Joint Video Experts Team (JVET) of ITU-T SG 16 WP 3 and ISO/IEC JTC 1/SC 29/WG 11, 24th Meeting: by teleconference, Oct. 6-15, 2021.

(Continued)

*Primary Examiner* — Amir Shahnami
(74) *Attorney, Agent, or Firm* — ScienBiziP, P.C.

(57) ABSTRACT

In a case that all network parameters are adaptively switched, it is difficult to switch the parameters for each small block, such as a CTU. There is a problem in that, in a case that ALF class classification and filtering are successively performed in ALF parallel after application of an NN filter, processing requires time. By selecting an NN model in a slice header and selecting a network layer finetuned in a CTU, the NN model can be adaptively selected even for each small block. By performing ALF class classification in an image before being subjected to an NN filter and performing ALF processing using an image subjected to NN filtering processing and ALF class information, the NN filtering processing and the ALF class classification can be performed in parallel.

7 Claims, 26 Drawing Sheets

(58) Field of Classification Search
USPC .................................................. 375/240.01
See application file for complete search history.

(56) References Cited

OTHER PUBLICATIONS

ITU-T, Telecommunication Standardization Sector of ITU, "Series H: Audiovisual and Multimedia Systems Infrastructure of audiovisual services—Coding of moving video", H.266(Aug. 2020).
Liqiang Wang et al., "EEI-1.3: neural network based in-loop filter", Document: JVET-X0052, Joint Video Experts Team (JVET) of ITU-T SG 16 WP 3 and 1S0/IEC JTC 1/SC 29, 24th Meeting, by teleconference, Oct. 6-15, 2021.
Dandan Ding et al., "A Switchable Deep Learning Approach for In-Loop Filtering in Video Coding", IEEE Transactions On Circuits and Systems for Video Technology, vol. 30, No. 7, Jul. 2020, pp. 1871-1887.

* cited by examiner

BLOCK BOUNDARY (a)

| | p30 | p20 | p10 | p00 | q00 | q10 | q20 | q30 | |
|---|---|---|---|---|---|---|---|---|---|
| BLOCK P | p31 | p21 | p11 | p01 | q01 | q11 | q21 | q31 | |
| | p32 | p22 | p12 | p02 | q02 | q12 | q22 | q32 | |
| | p33 | p23 | p13 | p03 | q03 | q13 | q23 | q33 | BLOCK Q |

(b)

| | p30 | p31 | p32 | p33 |
|---|---|---|---|---|
| | p20 | p21 | p22 | p23 |
| BLOCK P | p10 | p11 | p12 | p13 |
| | p00 | p01 | p02 | p03 |
| | q00 | q01 | q02 | q03 |
| | q10 | q11 | q12 | q13 |
| BLOCK Q | q20 | q21 | q22 | q23 |
| | q30 | q31 | q32 | q33 |

BLOCK BOUNDARY

FIG. 6

| slice_header( ) { | Descriptor |
|---|---|
|   if( sps_nn_enabled_flag && !pps_nn_info_in_ph_flag ) { | |
| SYN0001 →     sh_nn_enabled_flag | u(3) |
|     if( sh_nn_enabled_flag ) { | |
|       if( sps_chroma_format_idc != 0 ) | |
|         sh_nn_chroma_enabled_flag | u(1) |
|     } | |
|   } | |
|   if( sps_alf_enabled_flag && !pps_alf_info_in_ph_flag ) { | |
| SYN0002 →     sh_alf_enabled_flag | u(1) |
|     if( sh_alf_enabled_flag ) { | |
|       sh_num_alf_aps_ids_luma | u(3) |
|       for( i = 0; i < sh_num_alf_aps_ids_luma; i++ ) | |
|         sh_alf_aps_id_luma[ i ] | u(3) |
|       if( sps_chroma_format_idc != 0 ) { | |
|         sh_alf_cb_enabled_flag | u(1) |
|         sh_alf_cr_enabled_flag | u(1) |
|       } | |
|       if( sh_alf_cb_enabled_flag || sh_alf_cr_enabled_flag ) | |
|         sh_alf_aps_id_chroma | u(3) |
|       if( sps_ccalf_enabled_flag && !sh_nn_chroma_enabled_flag ) { | |
| SYN0003 →         sh_alf_cc_cb_enabled_flag | u(1) |
|         if( sh_alf_cc_cb_enabled_flag ) | |
|           sh_alf_cc_cb_aps_id | u(3) |
|         sh_alf_cc_cr_enabled_flag | u(1) |
|         if( sh_alf_cc_cr_enabled_flag ) | |
|           sh_alf_cc_cr_aps_id | u(3) |
|       } | |
|     } | |
|   } | |

FIG. 11

| | |
|---|---|
| coding_tree_unit() { | Descriptor |
|   if( sh_nn_enabled_flag ){ | |
|     nn_ctb_flag[ 0 ][ CtbAddrX ][ CtbAddrY ] | ae(v) |
|     if( nn_ctb_flag[ 0 ][ CtbAddrX ][ CtbAddrY ] ) | |
|       nn_luma_fixed_filter_idx | ae(v) |
|     if( sh_nn_chroma_enabled_flag ) { | |
|       nn_ctb_scale_idx [ 1 ][ CtbAddrX ][ CtbAddrY ] | ae(v) |
|       if( nn_ctb_scale_idx [ 1 ][ CtbAddrX ][ CtbAddrY ] >0 ) | |
|         nn_cb_fixed_filter_idx | ae(v) |
|     } | |
|     if( sh_nn_chroma_enabled_flag ) { | |
|       nn_ctb_scale_idx [ 2 ][ CtbAddrX ][ CtbAddrY ] | ae(v) |
|       if( nn_ctb_scale_idx [ 2 ][ CtbAddrX ][ CtbAddrY ] >0 ) | |
|         nn_cr_fixed_filter_idx | ae(v) |
|     } | |
|   } | |
| | |
|   if( sh_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ){ | |
|       if( sh_num_alf_aps_ids_luma > 0 ) | |
|         alf_use_aps_flag | ae(v) |
|       if( alf_use_aps_flag ) { | |
|         if( sh_num_alf_aps_ids_luma > 1 ) | |
|           alf_luma_prev_filter_idx | ae(v) |
|       } else | |
|         alf_luma_fixed_filter_idx | ae(v) |
|     } | |
|     if( sh_alf_cb_enabled_flag ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |
|         alf_ctb_filter_alt_idx[ 1 ][ CtbAddrX ][ CtbAddrY ] | ae(v) |
|     } | |
|     if( sh_alf_cr_enabled_flag ) { | |
|       alf_ctb_flag[ 2 ][ CtbAddrX ][ CtbAddrY ] | ae(v) |
|       if( alf_ctb_flag[ 2 ][ CtbAddrX ][ CtbAddrY ] | |
|         && alf_chroma_num_alt_filters_minus1 > 0 ) | |
|         alf_ctb_filter_alt_idx[ 2 ][ CtbAddrX ][ CtbAddrY ] | ae(v) |
|     } | |
|   } | |
|   if( sh_alf_cc_cb_enabled_flag && nn_ctb_scale_idx [ 1 ][ CtbAddrX ][ CtbAddrY ] == 0){ | |
|     alf_ctb_cc_cb_flag[ CtbAddrX ][ CtbAddrY ] | ae(v) |
|     if( alf_ctb_cc_cb_flag[ CtbAddrX ][ CtbAddrY ] ) | |
|       alf_ctb_cc_cb_idc[ CtbAddrX ][ CtbAddrY ] | ae(v) |
|   } | |
|   if( sh_alf_cc_cr_enabled_flag && nn_ctb_scale_idx [ 2 ][ CtbAddrX ][ CtbAddrY ] == 0){ | |
|     alf_ctb_cc_cr_flag[ CtbAddrX ][ CtbAddrY ] | ae(v) |
|     if( alf_ctb_cc_cr_flag[ CtbAddrX ][ CtbAddrY ] ) | |
|       alf_ctb_cc_cr_idc[ CtbAddrX ][ CtbAddrY ] | ae(v) |
|   } | |
| } | |

SYN0011 → nn_luma_fixed_filter_idx
SYN0012A → nn_ctb_scale_idx [ 1 ][ CtbAddrX ][ CtbAddrY ]
SYN0013A → nn_cb_fixed_filter_idx
SYN0012B → nn_ctb_scale_idx [ 2 ][ CtbAddrX ][ CtbAddrY ]
SYN0013B → nn_cr_fixed_filter_idx
SYN0014A → alf_ctb_cc_cb_flag[ CtbAddrX ][ CtbAddrY ]
SYN0015A → alf_ctb_cc_cb_idc[ CtbAddrX ][ CtbAddrY ]
SYN0014B → alf_ctb_cc_cr_flag[ CtbAddrX ][ CtbAddrY ]
SYN0015B → alf_ctb_cc_cr_idc[ CtbAddrX ][ CtbAddrY ]

FIG. 12

| coding_tree_unit( ) { | Descriptor |
|---|---|
|   if( sh_nn_enabled_flag ){ | |
|     nn_ctb_flag[ 0 ][ CtbAddrX ][ CtbAddrY ] | ae(v) |
|     if( nn_ctb_flag[ 0 ][ CtbAddrX ][ CtbAddrY ] ) | |
|       nn_luma_fixed_filter_idx | ae(v) |
|     if( sh_nn_chroma_enabled_flag ) { | |
|       nn_ctb_flag[ 1 ][ CtbAddrX ][ CtbAddrY ] | ae(v) |
|       if( nn_ctb_flag[ 1 ][ CtbAddrX ][ CtbAddrY ] ) | |
|         nn_cb_fixed_filter_idx | ae(v) |
|     } | |
|     if( sh_nn_chroma_enabled_flag ) { | |
|       nn_ctb_flag[ 2 ][ CtbAddrX ][ CtbAddrY ] | ae(v) |
|       if( nn_ctb_flag[ 2 ][ CtbAddrX ][ CtbAddrY ] ) | |
|         nn_cr_fixed_filter_idx | ae(v) |
|     } | |
|   } | |
| | |
|   if( sh_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ){ | |
|       if( sh_num_alf_aps_ids_luma > 0 ) | |
|         alf_use_aps_flag | ae(v) |
|       if( alf_use_aps_flag ) { | |
|         if( sh_num_alf_aps_ids_luma > 1 ) | |
|           alf_luma_prev_filter_idx | ae(v) |
|       } else | |
|         alf_luma_fixed_filter_idx | ae(v) |
|     } | |
|     if( sh_alf_cb_enabled_flag ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |
|         alf_ctb_filter_alt_idx[ 1 ][ CtbAddrX ][ CtbAddrY ] | ae(v) |
|     } | |
|     if( sh_alf_cr_enabled_flag ) { | |
|       alf_ctb_flag[ 2 ][ CtbAddrX ][ CtbAddrY ] | ae(v) |
|       if( alf_ctb_flag[ 2 ][ CtbAddrX ][ CtbAddrY ] | |
|         && alf_chroma_num_alt_filters_minus1 > 0 ) | |
|         alf_ctb_filter_alt_idx[ 2 ][ CtbAddrX ][ CtbAddrY ] | ae(v) |
|     } | |
|   } | |
| | |
|   if( sh_alf_cc_cb_enabled_flag && !nn_ctb_flag[ 1 ][ CtbAddrX ][ CtbAddrY ]){ | |
|     alf_ctb_cc_cb_flag[ CtbAddrX ][ CtbAddrY ] | ae(v) |
|     if( alf_ctb_cc_cb_flag[ CtbAddrX ][ CtbAddrY ] ) | |
|       alf_ctb_cc_cb_idc[ CtbAddrX ][ CtbAddrY ] | ae(v) |
|   if( sh_alf_cc_cr_enabled_flag && !nn_ctb_flag[ 2 ][ CtbAddrX ][ CtbAddrY ]){ | |
|     alf_ctb_cc_cr_flag[ CtbAddrX ][ CtbAddrY ] | ae(v) |
|     if( alf_ctb_cc_cr_flag[ CtbAddrX ][ CtbAddrY ] ) | |
|       alf_ctb_cc_cr_idc[ CtbAddrX ][ CtbAddrY ] | ae(v) |
| } | |

SYN0022A → (nn_ctb_flag[ 1 ] row)
SYN0022B → (nn_ctb_flag[ 2 ] row)
SYN0024A → (alf_ctb_cc_cb_flag row)
SYN0025A → (alf_ctb_cc_cb_idc row)
SYN0024B → (alf_ctb_cc_cr_flag row)
SYN0025B → (alf_ctb_cc_cr_idc row)

FIG. 13

| slice_header( ) { | Descriptor |
|---|---|
|   if( sps_nn_enabled_flag && !pps_nn_info_in_ph_flag ) { | |
|     sh_nn_enabled_flag | u(3) |
|     if( sh_nn_enabled_flag ) { | |
|       if( sps_chroma_format_idc != 0 ) | |
|         sh_nn_chroma_enabled_flag | u(1) |
|     } | |
|   } | |
|   if( sps_alf_enabled_flag && !pps_alf_info_in_ph_flag ) { | |
|     sh_alf_enabled_flag | u(1) |
|     if( sh_alf_enabled_flag ) { | |
|       sh_num_alf_aps_ids_luma | u(3) |
|       for( i = 0; i < sh_num_alf_aps_ids_luma; i++ ) | |
|         sh_alf_aps_id_luma[ i ] | u(3) |
|       if( sps_chroma_format_idc != 0 && !sh_nn_chroma_enabled_flag ) { | |
|         sh_alf_cb_enabled_flag | u(1) |
|         sh_alf_cr_enabled_flag | u(1) |
|       } | |
|       if( sh_alf_cb_enabled_flag \|\| sh_alf_cr_enabled_flag ) | |
|         sh_alf_aps_id_chroma | u(3) |
|       if( sps_ccalf_enabled_flag) { | |
|         sh_alf_cc_cb_enabled_flag | u(1) |
|         if( sh_alf_cc_cb_enabled_flag ) | |
|           sh_alf_cc_cb_aps_id | u(3) |
|         sh_alf_cc_cr_enabled_flag | u(1) |
|         if( sh_alf_cc_cr_enabled_flag ) | |
|           sh_alf_cc_cr_aps_id | u(3) |
|       } | |
|     } | |
|   } | |

Labels: SYN0031 → sh_nn_enabled_flag; SYN0032 → sh_nn_chroma_enabled_flag; SYN0033 → sh_alf_cb_enabled_flag

FIG. 15

| coding_tree_unit( ) { | Descriptor |
|---|---|
|   if ( sh_nn_enabled_flag ){ | |
|     nn_ctb_scale_idx[ 0 ][ CtbAddrX ][ CtbAddrY ] | ae(v) |
|     if( nn_ctb_scale_idx[ 0 ][ CtbAddrX ][ CtbAddrY ] ) | |
|       nn_luma_fixed_filter_idx | ae(v) |
|     if( sh_nn_chroma_enabled_flag ) { | |
|       nn_ctb_scale_idx[ 1 ][ CtbAddrX ][ CtbAddrY ] | ae(v) |
|       if( nn_ctb_scale_idx[ 1 ][ CtbAddrX ][ CtbAddrY ] >0 ) | |
|         nn_cb_fixed_filter_idx | ae(v) |
|     } | |
|     if( sh_nn_chroma_enabled_flag ) { | |
|       nn_ctb_scale_idx[ 2 ][ CtbAddrX ][ CtbAddrY ] | ae(v) |
|       if( nn_ctb_scale_idx[ 2 ][ CtbAddrX ][ CtbAddrY ] >0 ) | |
|         nn_cr_fixed_filter_idx | ae(v) |
|     } | |
|   } | |
| | |
|   if( sh_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ){ | |
|       if( sh_num_alf_aps_ids_luma > 0 ) | |
|         alf_use_aps_flag | ae(v) |
|       if( alf_use_aps_flag ) { | |
|         if( sh_num_alf_aps_ids_luma > 1 ) | |
|           alf_luma_prev_filter_idx | ae(v) |
|       } else | |
|         alf_luma_fixed_filter_idx | ae(v) |
|     } | |
|     if( sh_alf_cb_enabled_flag && | |
| nn_ctb_scale_idx[ 1 ][ CtbAddrX ][ CtbAddrY ] == 0 ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|       && alf_chroma_num_alt_filters_minus1 > 0 ) | |
|         alf_ctb_filter_alt_idx[ 1 ][ CtbAddrX ][ CtbAddrY ] | ae(v) |
|     } | |
|     if( sh_alf_cr_enabled_flag && | |
| nn_ctb_scale_idx[ 2 ][ CtbAddrX ][ CtbAddrY ] == 0) { | |
|       alf_ctb_flag[ 2 ][ CtbAddrX ][ CtbAddrY ] | ae(v) |
|       if( alf_ctb_flag[ 2 ][ CtbAddrX ][ CtbAddrY ] | |
|       && alf_chroma_num_alt_filters_minus1 > 0 ) | |
|         alf_ctb_filter_alt_idx[ 2 ][ CtbAddrX ][ CtbAddrY ] | ae(v) |
|     } | |
|   } | |
|   if( sh_alf_cc_cb_enabled_flag){ | |
|     alf_ctb_cc_cb_flag[ CtbAddrX ][ CtbAddrY ] | ae(v) |
|     if( alf_ctb_cc_cb_flag[ CtbAddrX ][ CtbAddrY ] ) | |
|       alf_ctb_cc_cb_idc[ CtbAddrX ][ CtbAddrY ] | ae(v) |
|   } | |
|   if( sh_alf_cc_cr_enabled_flag){ | |
|     alf_ctb_cc_cr_flag[ CtbAddrX ][ CtbAddrY ] | ae(v) |
|     if( alf_ctb_cc_cr_flag[ CtbAddrX ][ CtbAddrY ] ) | |
|       alf_ctb_cc_cr_idc[ CtbAddrX ][ CtbAddrY ] | ae(v) |
|   } | |
| } | |

Annotations (left margin arrows pointing to syntax elements):
- SYN0041 → nn_luma_fixed_filter_idx
- SYN0042A → nn_ctb_scale_idx[ 1 ][ CtbAddrX ][ CtbAddrY ]
- SYN0043A → nn_cb_fixed_filter_idx
- SYN0042B → nn_ctb_scale_idx[ 2 ][ CtbAddrX ][ CtbAddrY ]
- SYN0043B → nn_cr_fixed_filter_idx
- SYN0044A → alf_ctb_flag[ 1 ][ CtbAddrX ][ CtbAddrY ]
- SYN0045A → alf_ctb_filter_alt_idx[ 1 ][ CtbAddrX ][ CtbAddrY ]
- SYN0044B → alf_ctb_flag[ 2 ][ CtbAddrX ][ CtbAddrY ]
- SYN0045B → alf_ctb_filter_alt_idx[ 2 ][ CtbAddrX ][ CtbAddrY ]

FIG. 16

| | Descriptor |
|---|---|
| coding_tree_unit( ) { | |
|   if( sh_nn_enabled_flag ){ | |
|     nn_ctb_flag[ 0 ][ CtbAddrX ][ CtbAddrY ] | ae(v) |
|     if( nn_ctb_flag[ 0 ][ CtbAddrX ][ CtbAddrY ] ) | |
|       nn_luma_fixed_filter_idx | ae(v) |
|     if( sh_nn_chroma_enabled_flag ){ | |
|       nn_ctb_flag[ 1 ][ CtbAddrX ][ CtbAddrY ] | ae(v) |
|       if( nn_ctb_flag[ 1 ][ CtbAddrX ][ CtbAddrY ] ) | |
|         nn_cb_fixed_filter_idx | ae(v) |
|     } | |
|     if( sh_nn_chroma_enabled_flag ){ | |
|       nn_ctb_flag[ 2 ][ CtbAddrX ][ CtbAddrY ] | ae(v) |
|       if( nn_ctb_flag[ 2 ][ CtbAddrX ][ CtbAddrY ] ) | |
|         nn_cr_fixed_filter_idx | ae(v) |
|     } | |
|   } | |
| | |
|   if( sh_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ){ | |
|       if( sh_num_alf_aps_ids_luma > 0 ) | |
|         alf_use_aps_flag | ae(v) |
|       if( alf_use_aps_flag ){ | |
|         if( sh_num_alf_aps_ids_luma > 1 ) | |
|           alf_luma_prev_filter_idx | ae(v) |
|       } else | |
|         alf_luma_fixed_filter_idx | ae(v) |
|     } | |
|     if( sh_alf_cb_enabled_flag && !nn_ctb_flag[ 1 ][ CtbAddrX ][ CtbAddrY ]){ | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |
|         alf_ctb_filter_alt_idx[ 1 ][ CtbAddrX ][ CtbAddrY ] | ae(v) |
|     } | |
|     if( sh_alf_cr_enabled_flag && !nn_ctb_flag[ 2 ][ CtbAddrX ][ CtbAddrY ]){ | |
|       alf_ctb_flag[ 2 ][ CtbAddrX ][ CtbAddrY ] | ae(v) |
|       if( alf_ctb_flag[ 2 ][ CtbAddrX ][ CtbAddrY ] | |
|         && alf_chroma_num_alt_filters_minus1 > 0 ) | |
|         alf_ctb_filter_alt_idx[ 2 ][ CtbAddrX ][ CtbAddrY ] | ae(v) |
|     } | |
|   } | |
| | |
|   if( sh_alf_cc_cb_enabled_flag ){ | |
|     alf_ctb_cc_cb_flag[ CtbAddrX ][ CtbAddrY ] | ae(v) |
|     if( alf_ctb_cc_cb_flag[ CtbAddrX ][ CtbAddrY ] ) | |
|       alf_ctb_cc_cb_idc[ CtbAddrX ][ CtbAddrY ] | ae(v) |
|   if( sh_alf_cc_cr_enabled_flag ){ | |
|     alf_ctb_cc_cr_flag[ CtbAddrX ][ CtbAddrY ] | ae(v) |
|     if( alf_ctb_cc_cr_flag[ CtbAddrX ][ CtbAddrY ] ) | |
|       alf_ctb_cc_cr_idc[ CtbAddrX ][ CtbAddrY ] | ae(v) |
| } | |

SYN0052A → (nn_ctb_flag[ 1 ] row)
SYN0052B → (nn_ctb_flag[ 2 ] row)
SYN0054A → (alf_ctb_flag[ 1 ] row)
SYN0055A → (alf_ctb_filter_alt_idx[ 1 ] row)
SYN0054B → (alf_ctb_flag[ 2 ] row)
SYN0055B → (alf_ctb_filter_alt_idx[ 2 ] row)

FIG. 17

| slice_header( ) { | Descriptor |
|---|---|
|   if( sps_nn_enabled_flag && !pps_nn_info_in_ph_flag ) { | |
|     sh_nn_enabled_flag | u(1) |
|     if( sh_nn_enabled_flag ) { | |
|       sh_nn_luma_fixed_filter_idx | u(v) |
|       if(sh_chroma_format_idc != 0 ) { | |
|         sh_nn_chroma_enabled_flag | u(1) |
|         if( sh_nn_chroma_enabled_flag ) | |
|           sh_nn_cb_fixed_filter_idx | u(v) |
|           sh_nn_cr_fixed_filter_idx | |
|         } | |
|       } | |
|     } | |
| } | |

SYN0101 → sh_nn_enabled_flag
SYN0102 → sh_nn_luma_fixed_filter_idx
SYN0103 → sh_nn_chroma_enabled_flag
SYN0104 → sh_nn_cb_fixed_filter_idx

FIG. 19

| coding_tree_unit( ) { | Descriptor |
|---|---|
|   if( sh_nn_enabled_flag ) { | |
|     nn_part_filter_idx[0][CtbAddrX][CtbAddrY] | ae(v) |
|     if(sh_nn_chroma_enabled_flag){ | |
|       nn_part_filter_idx[1][CtbAddrX][CtbAddrY] | ae(v) |
|       nn_part_filter_idx[2][CtbAddrX][CtbAddrY] | ae(v) |
|     } | |
|   } | |
| } | |

SYN0111 → row with nn_part_filter_idx[0]
SYN0112 → row with nn_part_filter_idx[1]

FIG. 20

| slice_header( ) { | Descriptor |
|---|---|
|   if( sps_nn_enabled_flag && !pps_nn_info_in_ph_flag ) { | |
|     sh_nn_enabled_flag | u(3) |
|     if( sh_nn_enabled_flag ) { | |
|       sh_nn_luma_beta_offset_div2 | se(v) |
|       sh_nn_luma_tc_offset_div2 | se(v) |
|       if(sps_chroma_format_idc != 0 ) { | |
|         sh_nn_chroma_enabled_flag | u(1) |
|         if( sh_nn_chroma_enabled_flag ) { | |
|           sh_nn_cb_beta_offset_div2 | se(v) |
|           sh_nn_cb_tc_offset_div2 | se(v) |
|           sh_nn_cr_beta_offset_div2 | se(v) |
|           sh_nn_cr_tc_offset_div2 | se(v) |
|         } | |
|       } | |
|     } | |
|   } | |
| } | |

SYN0201 → sh_nn_enabled_flag
SYN0202 → sh_nn_luma_beta_offset_div2
SYN0203 → sh_nn_chroma_enabled_flag
SYN0204 → sh_nn_cb_beta_offset_div2

FIG. 23

| slice_header( ) { | Descriptor |
|---|---|
|   if( sps_nn_enabled_flag && !pps_nn_info_in_ph_flag && pps_rect_slice_flag) { | |
|     sh_nn_enabled_flag | u(3) |
|     if( sh_nn_enabled_flag ) { | |
|       if( sps_chroma_format_idc != 0 ) | |
|         sh_nn_chroma_enabled_flag | u(1) |
|     } | |
|   } | |
| } | |

SYN0401 → sh_nn_enabled_flag

SYN0402 → sh_nn_chroma_enabled_flag

FIG. 26

VIDEO CODING APPARATUS AND VIDEO DECODING APPARATUS

TECHNICAL FIELD

Embodiments of the present invention relate to a video coding apparatus and a video decoding apparatus. This application claims priority based on JP 2021-188749 filed on Nov. 19, 2021, the contents of which are incorporated herein by reference.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and an H.265/High-Efficiency Video Coding (HEVC) scheme, and the like.

In such a video coding scheme, images (pictures) constituting a video are managed in a hierarchical structure including slices obtained by splitting an image, Coding Tree Units (CTUs) obtained by splitting a slice, units of coding (which may also be referred to as Coding Units (CUs)) obtained by splitting a coding tree unit, and Transform Units (TUs) obtained by splitting a coding unit, and are coded/decoded for each CU.

In such a video coding scheme, a prediction image is usually generated based on a local decoded image that is obtained by coding/decoding an input image (a source image), and prediction errors (which may be referred to also as "difference images" or "residual images") obtained by subtracting the prediction image from the input image are coded. Generation methods of prediction images include inter-picture prediction (inter prediction) and intra-picture prediction (intra prediction). An in-loop filter technique is defined, which is a technique of reducing coding noise generated due to quantization processing in a coding loop to forestall propagation of image quality deterioration among frames.

NPL 1 is given as a technique of video coding and decoding in recent years.

NPL 1 discloses a method in which neural network filters are allocated between an SAO and an ALF of in-loop filters, and a network model is adaptively selected for each CTU depending on an input.

CITATION LIST

Non Patent Literature

NPL 1: Z. Dai, Y. Yu, H. Yu, K. Sato, L. Xu, Z. Xie, D. Wang, "[AHG11] Neural Network-based Adaptive Model Selection for CNN In-Loop Filtering", JVET-X0126, October 2021.

SUMMARY OF INVENTION

Technical Problem

In NPL 1, all network parameters are adaptively switched depending on an input image. However, in a case that all of the whole network parameters are switched, it is difficult to switch the parameters for each small block, such as the CTU. In NPL 1, Neural Network (NN) filtering processing is performed prior to the ALF; however, there is a problem in that, in a case that ALF class classification and filtering are successively performed after application of the NN filter, processing requires time.

Solution to Problem

A video decoding apparatus according to an aspect of the present invention includes: a header decoder configured to decode an NN model index from coded data in a parameter set, a picture header, or a slice header; a CT information decoder 3021 configured to decode an NN layer index from the coded data on a CTU basis; an NN filter unit configured to perform filtering processing, using a neural network including multiple layers; and an NN layer selection unit configured to switch a parameter of a specific layer out of the multiple layers of a neural network model. The NN filter unit selects a model to be used in the NN filter unit, based on the NN model index. The NN layer selection unit switches the parameter of the specific layer, based on the NN layer index.

Included are: a CT decoder configured to decode nn_ctb_ flag in a CTU; an ALF processing unit configured to apply ALF processing to a decoded image; an NN filter unit configured to apply filtering processing to the decoded image, using a neural network; and an ALF padding unit. The ALF unit includes: an ALF class classification unit configured to perform ALF class classification; and an ALF class filter unit configured to perform an ALF class filter. The ALF class classification unit performs class classification from an unprocessed image of the NN filter unit. The ALF class filter unit performs class filtering from a processed image of the NN filter unit.

Advantageous Effects of Invention

By selecting an NN model in a first region and selecting a network layer finetuned in a second region smaller than the first region, the NN model can be adaptively selected even for each small block, without overhead necessary for switching the entire NN model.

By performing ALF class classification in an image before being subjected to an NN filter and performing ALF processing using an image subjected to NN filtering processing and ALF class information, the NN filtering processing and the ALF class classification can be performed in parallel.

BRIEF DESCRIPTION OF DRAWINGS

FIG. 6 is a diagram illustrating a deblocking filter.

FIG. 11 is diagram illustrating syntax for performing exclusive switching of flags of the ccALF and the NN filter in a slice header.

FIG. 12 is a diagram illustrating syntax for performing exclusive switching of ccALF flags and NN scale indexes in a CTU.

FIG. 13 is a diagram illustrating syntax for performing exclusive switching of ccALF flags and NN flags in the CTU.

FIG. 15 is a diagram illustrating syntax for performing exclusive switching of flags of a chrominance ALF and the NN filter in the slice header.

FIG. 16 is a diagram illustrating syntax for performing exclusive switching of ALF flags and NN scale indexes in the CTU in the CTU.

FIG. 17 is a diagram illustrating syntax for performing exclusive switching of ALF flags and NN flags in the CTU.

FIG. 19 is a diagram illustrating decoding of NN model indexes in the slice header.

FIG. 20 is a diagram illustrating decoding of NN partial model indexes in the CTU.

FIG. 23 is a diagram illustrating syntax related to decoding of the parameters for bS calculation of the NN filter.

FIG. 26 is a diagram illustrating syntax related to flags for enabling application of the NN filter only in a case that the slice is rectangular.

DESCRIPTION OF EMBODIMENTS

First Embodiment

Embodiments of the present invention will be described below with reference to the drawings.

Figure 1:
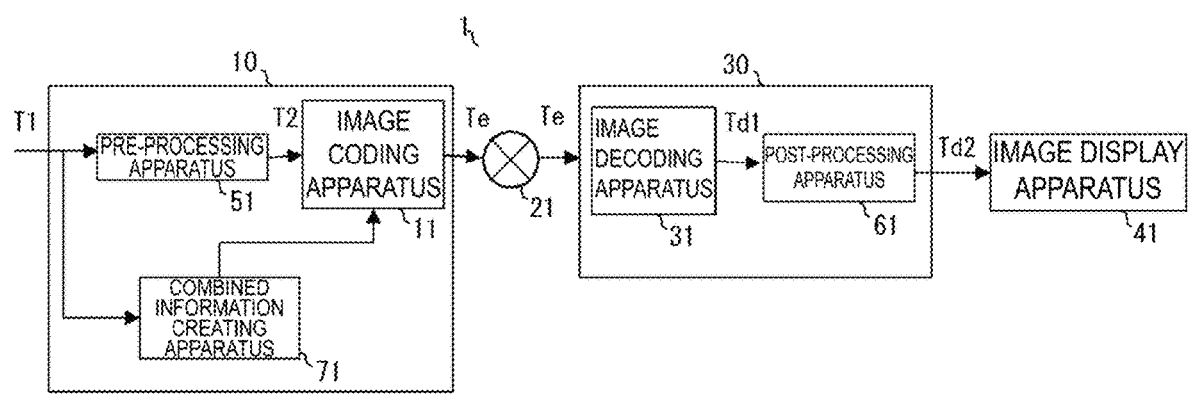
FIG. 1 is a schematic diagram illustrating a configuration of a video transmission system according to the present embodiment.

FIG. 1 is a schematic diagram illustrating a configuration of a video transmission system according to the present embodiment.

The video transmission system 1 is a system for transmitting coded data in which an image, whose resolution has been converted, with a different resolution is coded, decoding the coded data transmitted, and inversely transforming the coded data decoded into the image with the original resolution for display. The video transmission system 1 includes a video coding apparatus 10, a network 21, a video decoding apparatus 30, and an image display apparatus 41.

The video coding apparatus 10 includes a pre-processing apparatus (pre-processing unit) 51, an image coding apparatus (image coder) 11, and a combined information creating apparatus (combined information creating unit) 71.

The video decoding apparatus 30 includes an image decoding apparatus (image decoder) 31 and a post-processing apparatus (post-processing unit) 61.

The pre-processing apparatus 51 converts the resolution of an image T included in a video as necessary, and supplies a variable resolution video T2 including the image with a different resolution to the image coding apparatus 11. The pre-processing apparatus 51 may supply, to the image coding apparatus 11, filter information indicating the presence or absence of resolution conversion of the image.

The combined information creating apparatus 71 creates the filter information based on an image T1 included in the video, and transmits the filter information to the image coding apparatus 11.

The variable resolution image T2 is input to the image coding apparatus 11. With use of a framework of Reference Picture Resampling (RPR), the image coding apparatus 11 codes image size information of an input image for each PPS, and transmits the coded image size information to the image decoding apparatus 31.

The network 21 transmits the coded filter information and the coded data Te to the image decoding apparatus 31. A part or all of the coded filter information may be included in the coded data Te as supplemental enhancement information SEI. The network 21 is the Internet, a Wide Area Network (WAN), a Local Area Network (LAN), or a combination thereof. The network 21 is not necessarily a bidirectional communication network and may be a unidirectional communication network that transmits broadcast waves for terrestrial digital broadcasting, satellite broadcasting, or the like. The network 21 may be substituted by a storage medium in which the coded data Te is recorded, such as a Digital Versatile Disc (DVD) (trade name) or a Blu-ray Disc (BD) (trade name).

The image decoding apparatus 31 decodes each of the coded data Te transmitted by the network 21 and generates and supplies a variable resolution decoded image to the post-processing apparatus 61.

In a case that the filter information indicates resolution conversion, the post-processing apparatus 61 performs super-resolution processing using a model parameter for super-resolution, based on the image size information included in the coded data. By inversely transforming the image that has been subjected to resolution conversion, a decoded image of an original size is generated. In a case that the filter information does not indicate resolution conversion, image reconstruction processing using a model parameter for image reconstruction is performed. By performing the image reconstruction processing, a decoded image with reduced coding noise is generated.

The image display apparatus 41 displays all or part of one or multiple decoded images Td2 input from the post-processing apparatus 61. For example, the image display apparatus 41 includes a display device such as a liquid crystal display and an organic Electro-luminescence (EL) display. Examples of display types include stationary, mobile, and HMD. In a case that the image decoding apparatus 31 has a high processing capability, an image having high image quality is displayed, and in a case that the apparatus has a lower processing capability, an image which does not require high processing capability and display capability is displayed.

Operators

Operators used herein will be described below.

">>" is a right bit shift, "<<" is a left bit shift, "&" is a bitwise AND, "|" is a bitwise OR, "|=" is an OR assignment operator, and "||" indicates a logical sum.

x?y:z is a ternary operator that takes y in a case that x is true (other than 0) and takes z in a case that x is false (0).

Clip3 (a, b, c) is a function to clip c in a value of a to b, and a function to return a in a case that c is smaller than a (c<a), return b in a case that c is greater than b (c>b), and return c in the other cases (provided that a is smaller than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

a^b represents the b-th power of a. In a case that a=2 and b is an integer, 2^b=1<<b.

Structure of Coded Data Te

Prior to the detailed description of the image coding apparatus 11 and the image decoding apparatus 31 according to the present embodiment, a data structure of the coded data Te generated by the image coding apparatus 11 and decoded by the image decoding apparatus 31 will be described.

Figure 2:
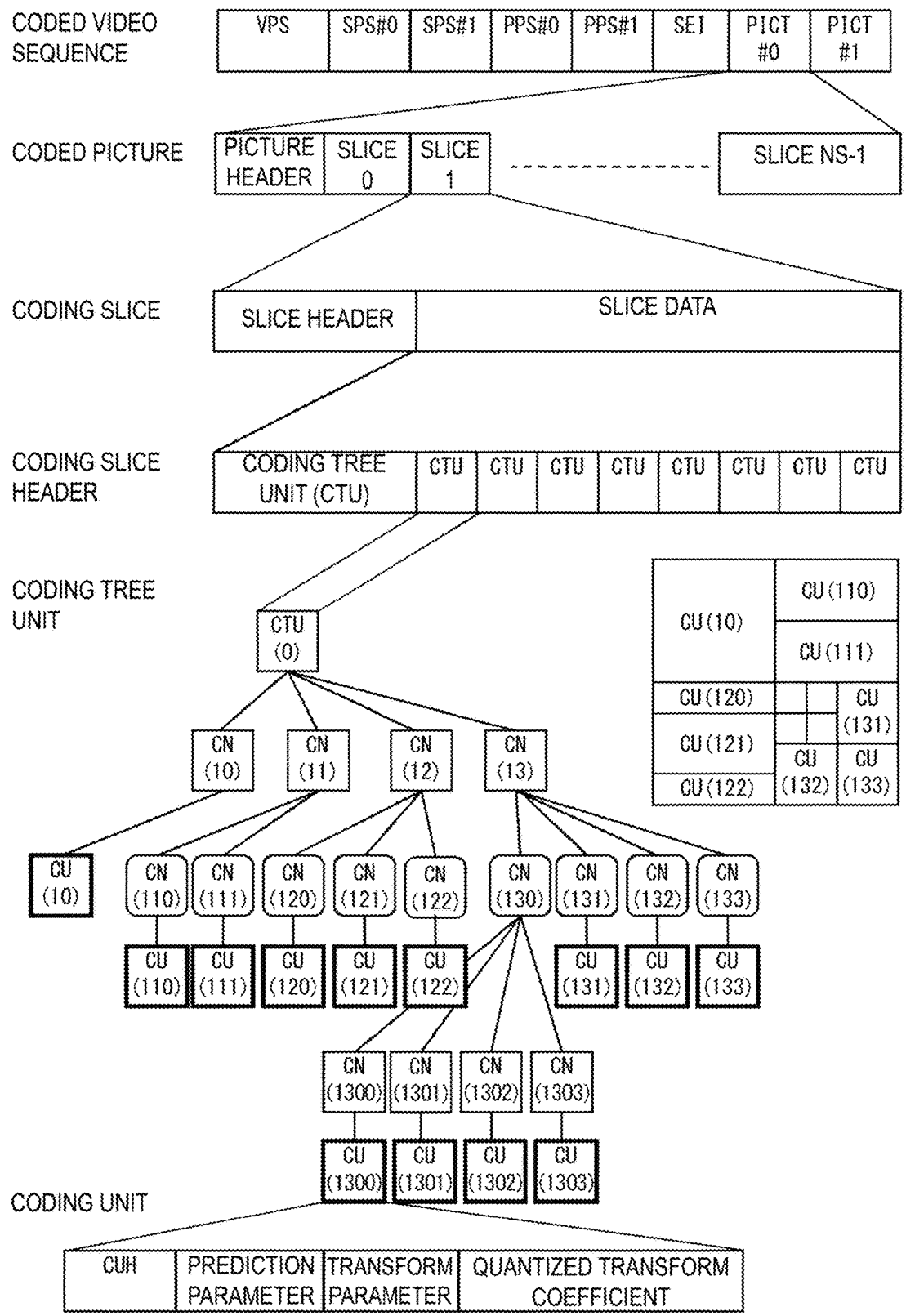
FIG. 2 is a diagram illustrating a hierarchical structure of coded data.

FIG. 2 is a diagram illustrating a hierarchical structure of the coded data Te. The coded data Te includes a sequence and multiple pictures constituting the sequence illustratively. FIG. 2 is a diagram illustrating a coded video sequence prescribing a sequence SEQ, a coded picture defining a picture PICT, a coding slice defining a slice S, coding slice data defining slice data, a coding tree unit included in the coding slice data, and a coding unit included in the coding tree unit.

Coded Video Sequence

In the coded video sequence, a set of data referred to by the image decoding apparatus 31 to decode the sequence SEQ to be processed is defined. As illustrated in FIG. 2, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of the multiple SPSs is selected from the PPS.

Coded Picture

In the coded picture, a set of data referred to by the image decoding apparatus 31 to decode the picture PICT to be processed is defined. As illustrated in FIG. 2, the picture PICT includes a picture header PH and slices 0 to NS−1 (NS is the total number of slices included in the picture PICT).

In the description below, in a case that the slices 0 to NS−1 need not be distinguished from one another, subscripts of reference signs may be omitted. The same applies to other data with suffixes included in the coded data Te which will be described below.

Coding Slice

In the coding slice, a set of data referred to by the image decoding apparatus 31 to decode the slice S to be processed is defined. The slice includes a slice header and slice data as illustrated in FIG. 2.

The slice header includes a coding parameter group referred to by the image decoding apparatus 31 to determine a decoding method for a target slice. Slice type indication information (slice_type) indicating a slice type is one example of a coding parameter included in the slice header.

Examples of slice types that can be indicated by the slice type indication information include (1) I slices for which only intra prediction is used in coding, (2) P slices for which uni-prediction (L0 prediction) or intra prediction is used in coding, and (3) B slices for which uni-prediction (L0 prediction or L1 prediction), bi-prediction, or intra prediction is used in coding, and the like. Note that the inter prediction is not limited to uni-prediction and bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referred to by the image decoding apparatus 31 to decode the slice data to be processed is defined. Slice data includes Coding Tree Units (CTUs) as illustrated in the coding slice header of FIG. 2. The CTU is a block of a fixed size (for example, 64×64) constituting a slice, and may also be called a Largest Coding Unit (LCU) or a Coding Tree Block (CTB).

Coding Tree Unit

In FIG. 2, a set of data is defined that is referred to by the image decoding apparatus 31 to decode the CTU to be processed. The CTU is split into coding units CUs, each of which is a basic unit of coding processing, by a recursive quad tree split, binary tree split, or ternary tree split. Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

In FIG. 2, a set of data referred to by the image decoding apparatus 31 to decode the coding unit to be processed is defined. Specifically, the CU includes a CU header CUH, a prediction parameter, a transform parameter, a quantized transform coefficient, and the like. In the CU header, a prediction mode and the like are defined.

There are cases that the prediction processing is performed in units of CU or performed in units of sub-CU in which the CU is further split.

There are two types of predictions (prediction modes), which are intra prediction and inter prediction. The intra prediction refers to prediction in an identical picture, and the inter prediction refers to prediction processing performed between different pictures (for example, between pictures of different display times, and between pictures of different layer images).

Transform and quantization processing is performed in units of CU, but the quantized transform coefficient may be subjected to entropy coding in units of subblock such as 4×4.

Prediction Parameters

A prediction image is derived by prediction parameters associated with blocks. The prediction parameters include intra prediction and inter prediction parameters.

Configuration of Image Decoding Apparatus

Figure 3:
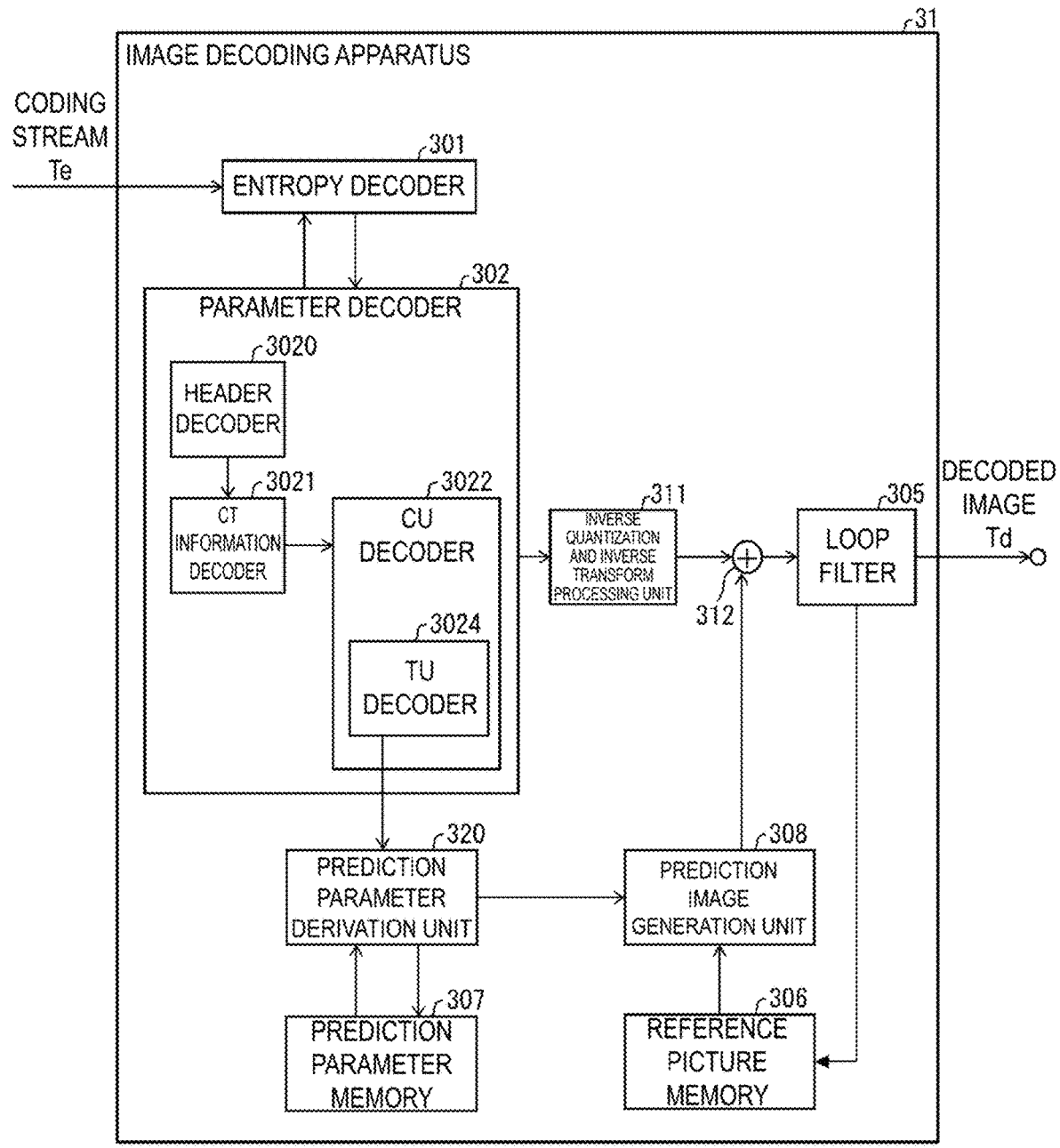
FIG. 3 is a schematic diagram illustrating a configuration of an image decoding apparatus.

A configuration of the image decoding apparatus 31 (FIG. 3) according to the present embodiment will be described.

The image decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the image decoding apparatus 31 may be used in accordance with the image coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and the APS, a picture header, a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and a quantization prediction error (residual_coding) from coded data.

The TU decoder 3024 decodes QP update information and a quantization prediction error from the coded data.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

In addition, although an example in which CTUs and CUs are used as processing units will be described below, the processing is not limited to this example, and processing in units of sub-CUs may be performed. Alternatively, the CTUs and the CUs may be replaced with blocks, the sub-CUs may be replaced with by subblocks, and processing may be performed in units of blocks or subblocks.

The entropy decoder 301 performs entropy decoding on the coded data Te input from the outside and separates and decodes individual codes (syntax elements).

The entropy decoder 301 outputs the decoded codes to the parameter decoder 302. Which code is to be decoded is controlled based on an indication of the parameter decoder 302.

Basic Flow

Figure 4:
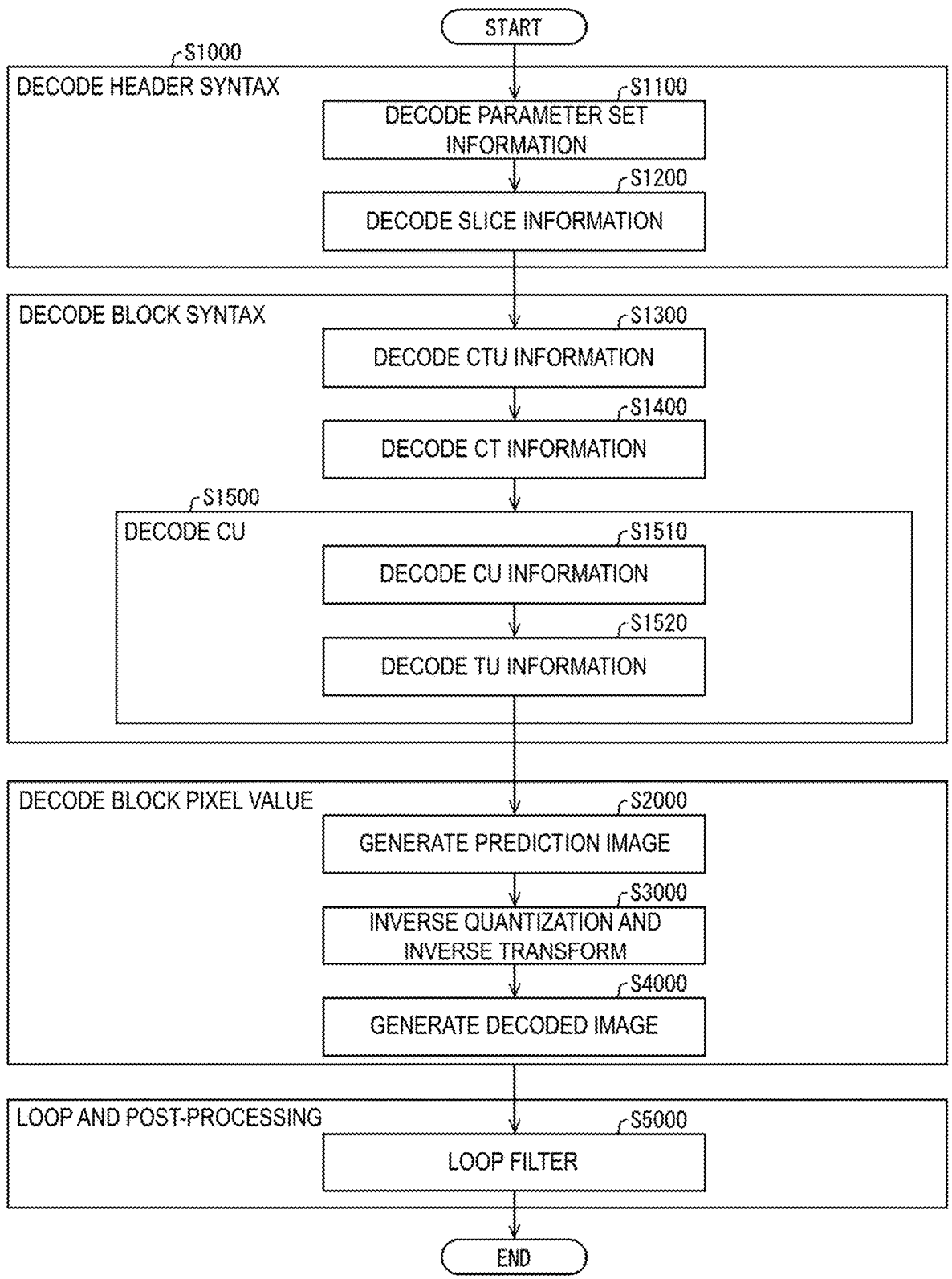
FIG. 4 is a flowchart illustrating general operation of the image decoding apparatus.

FIG. 4 is a flowchart illustrating general operation of the image decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the image decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a CU residual flag, and the like from the coded data.

(S1520: Decoding of TU information) In a case that the TU includes a prediction error, the TU decoder 3024 decodes, from the coded data, QP update information, a quantization prediction error, and the like. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a sample adaptive offset (SAO), an adaptive loop filter (ALF), a cross component ALF (ccALF), a neural network filter (NN), and a cross component neural network filter (ccNN) to a decoded image of a CU generated by the addition unit 312.

A SAO unit adds an offset to an image subjected to the DF, depending on a class of the SAO. Class classifications of the SAO include a Band offset and an Edge Offset.

An ALF unit 312 splits an image subjected to the DF or the SAO processing into 4×4 small regions. A luma image (Y image) is classified into multiple classes (for example, 25) for each small region, based on directionality (for example, five directional classes) and activity (for example, five classes). Then, filtering processing is performed using a filter based on the classification, and the processed image is output. A 7×7 diamond-shaped filter may be applied to the Y image, and a 5×5 diamond-shaped filter may be applied to chroma images (Cb and Cr images). As a filter coefficient of the ALF, a filter coefficient decoded from the coded data, as well as a fixed filter included in the video decoding apparatus and the video coding apparatus in advance may be used.

A ccALF unit 313 adds filtering processing results for pixels (for example, 8 pixels) around the Y image corresponding to the same position as the pixel positions of Cb and Cr to each of pixel values of Cb and Cr for the Y image subjected to the DF or subjected to the SAO processing. A filter coefficient of the ccALF is also decoded and coded with the coded data.

The reference picture memory 306 stores a decoded image of the CU in a predefined position for each target picture and target CU.

The prediction parameter memory 307 stores the prediction parameter in a predefined position for each CTU or CU.

Specifically, the prediction parameter memory 307 stores the parameter decoded by the parameter decoder 302, the parameter derived by the prediction parameter derivation unit 320, and the like.

Parameters derived by the prediction parameter derivation unit 320 are input to the prediction image generation unit 308. In addition, the prediction image generation unit 308 reads a reference picture from the reference picture memory 306. The prediction image generation unit 308 generates a prediction image of a block or a subblock by using the parameters and the reference picture (reference picture block) in the prediction mode indicated by predMode. Here, the reference picture block refers to a set of pixels (referred to as a block because they are normally rectangular) on a reference picture and is a region that is referred to for generating a prediction image.

The inverse quantization and inverse transform processing unit 311 performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

The inverse quantization and inverse transform processing unit 311 performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Image Coding Apparatus

Figure 5:
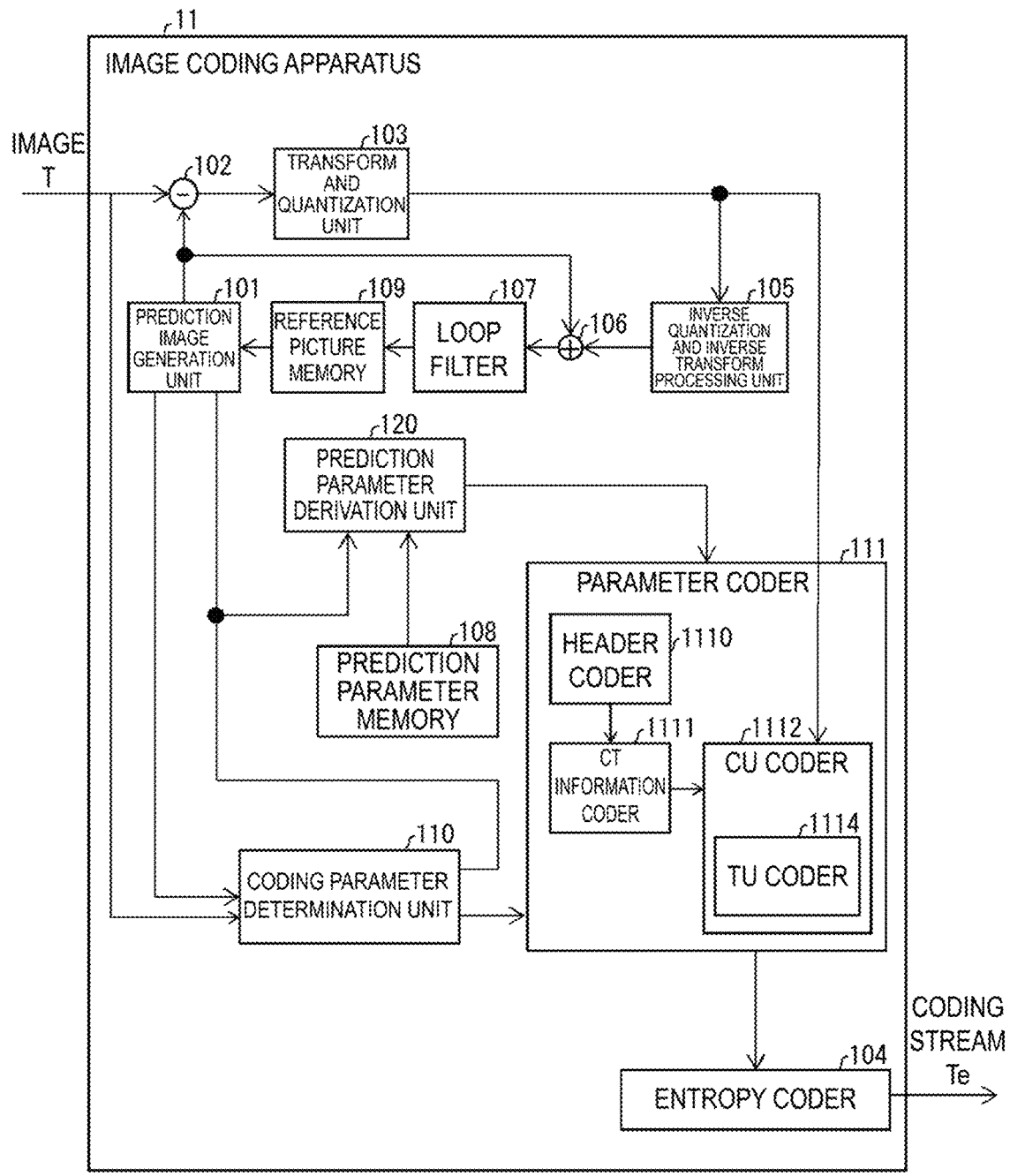
FIG. 5 is a block diagram illustrating a configuration of an image coding apparatus.

Next, a configuration of the image coding apparatus 11 according to the present embodiment will be described. FIG. 5 is a block diagram illustrating a configuration of the image coding apparatus 11 according to the present embodiment. The image coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes an inter prediction image generation unit 309 and an intra prediction image generation unit 310.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The inverse quantization and inverse transform processing unit 105 is the same as the inverse quantization and inverse transform processing unit 311 (FIG. 3) in the image decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as filter information, header information, split information, prediction information, and quantized transform coefficients.

The CT information coder 1111 codes the split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as an inter prediction parameter, an intra prediction parameter, and the quantized transform coefficient.

The parameter coder 111 inputs the quantized transform coefficients and the coding parameters (split information and prediction parameters) to the entropy coder 104. The entropy coder 104 entropy-codes these to generate the coded data Te and outputs the coded data Te.

The prediction parameter derivation unit 120 is a component including an inter prediction parameter coder 112 and an intra prediction parameter coder 113, and derives an intra prediction parameter and an intra prediction parameter from the parameters input from the coding parameter determination unit 110.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include the split information or the prediction parameter described above, or a parameter to be coded which is generated in relation thereto. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient λ by a square error. The code amount is an amount of information of the coded data Te obtained by performing entropy coding on a quantization error and a coding parameter. The square error is the square sum of the prediction errors calculated in the subtraction unit 102. The coefficient λ is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement some of the image coding apparatus 11 and the image decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" mentioned here refers to a computer system built into either the image coding apparatus 11 or the image decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and may be realized as dedicated circuits or a multi-purpose processor. In a case that, with advances in semiconductor technology, a circuit integration technology with which an LSI is replaced appears, an integrated circuit based on the technology may be used.

Although embodiments of the present invention have been described above in detail with reference to the drawings, the specific configurations thereof are not limited to those described above and various design changes or the like can be made without departing from the spirit of the invention.

ALF Unit 312

The ALF unit 312 inputs a reconstructed image recSample [cIdx], and outputs a processed reconstructed image alfPicture[cIdx].

ccALF Unit 313

The ccALF unit 313 inputs an ALF-unprocessed reconstructed luma image recSamples[0] and a ccALF filter coefficient CcAlfCoeff[j] (j=0 . . . 6), and outputs a processed correction value sum.

The output sum of the ccAlf unit 313 is added to alfPicture[cIdx], and a chrominance decoded image recSamples [cIdx][x][y] is generated. Here, cIdx=1, 2. recSamples[cIdx] [x][y]=alfPicture[cIdx][x][y]+sum FIG. 6 is a diagram illustrating an example of the deblocking filter.

In a case that a difference of pixel values of pixels adjoining along a block (CTU/CU/TU) boundary of an input image is within a predetermined range, a DF unit 603 determines that there is block distortion. By performing deblocking processing on the block boundary in the input image, an image around the block boundary is smoothed. The image subjected to the deblocking processing using the deblocking filter is a deblocked decoded image P_DB.

Configuration Example of NN Filter Unit 611

Figure 7:
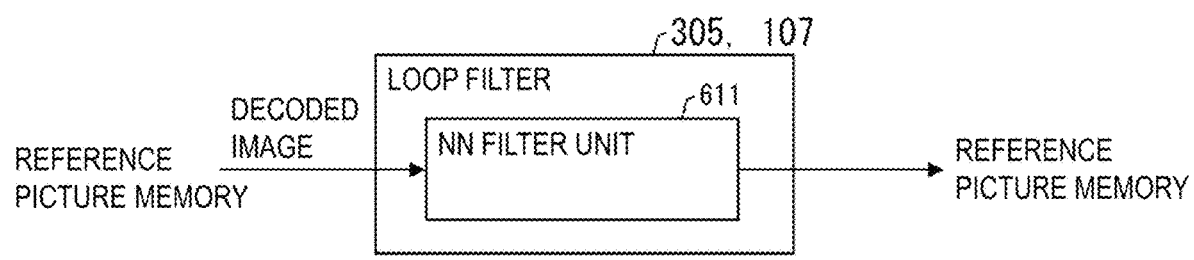
FIG. 7 is a diagram illustrating a configuration of a neural network of an NN filter unit 611.

FIG. 7 is a diagram illustrating a configuration of a neural network filter unit (NN filter unit 611) in the loop filter 305. The NN filter unit 611 is a component for performing filtering processing by a neural network model on the input image. Simultaneously, the size may be reduced or enlarged to an actual size or to a size of a multiple of a rational number.

Here, a neural network model (hereinafter referred to as an NN model) means elements and connection relationships (a topology) of a neural network and parameters (weights and biases) of the neural network. Note that only the parameters of the neural network model may be switched with the topology being fixed.

The loop filter 305 of the video decoding apparatus (the loop filter 107 of the video coding apparatus) includes the NN filter unit 611. The NN filter unit 611 applies a filter to an image of the reference picture memory 306/106, and stores the image in the reference picture memory 306/106. As has been already described, the loop filter may include a DF, an ALF, an SAO, a bilateral filter, or the like.

Details of NN Filter Unit 611

An NN filter performs the filtering processing by the neural network model, using an input image inSamples and input parameters (for example, QP, bS, and the like). The input image may be an image for each component, or may be an image in which an image of multiple components is a different channel. The input parameters may be used as a different channel from the image.

The neural network may repeatedly apply the following processing.

As shown in the following expression, inSamples is subjected to convolution operation using a kernel k[m][i][j], and an output image outSamples to which bias is added is derived. Here, nn=0 . . . n−1, xx=0 . . . width−1, and yy=0 . . . height−1.

$$outSamples[nn][xx][yy] = \sum\sum\sum (k[mm][i][j] * inSamples[mm][xx+i-of][yy+j-of] + bias[nn])$$

In a case of 1×1 Conv (convolution operation, Convolution), Σ represents the sum for each of mm=0 . . . m−1, i=0, and j=0. In this case, of =0 is set. In a case of 3×3 Conv, Σ represents the sum for each of mm=0 . . . m−1, i=0 . . . 2, and j=0 . . . 2. In this case, of =1 is set. n represents the number of channels of outSamples, m represents the number of channels of inSamples, width represents the width of inSamples and outSamples, and height represents the height of inSamples and outSamples. of represents the size of padding provided around inSamples in order to make inSamples and outSamples have the same size. In the following, in a case that output of the NN filter is a correction value, corrNN is used instead of outSamples.

Processing shown by the following expression referred to as Depth wise Convolution may be performed. Here, nn=0 . . . n−1, xx=0 . . . width−1, and yy=0 . . . height−1.

$$outSamples[nn][xx][yy] = \sum\sum (k[nn][i][j] * inSamples[nn][xx+i-of][yy+j-of] + bias[nn])$$

Σ represents the sum for each of i and j. n represents the number of channels of outSamples and inSamples, width represents the width of inSamples and outSamples, and height represents the height of inSamples and outSamples.

Non-linear processing referred to as Activate, such as ReLU, may be used.

$$ReLU(x) = x >= 0 ? x : 0$$

leakyReLU shown in the following expression may be used.

$$leakyReLU(x) = x >= 0 ? x : a * x$$

Here, a is a prescribed value, for example, 0.1 or 0.125. In order to perform integer arithmetic, all of the above values of k, bias, and a may be integers, and right shifting may be performed after Conv.

In ReLU, for values less than 0, 0 is invariably output, and for values equal to or greater than 0, an input value is directly output. In contrast, in leakyReLU, for values less than 0, linear processing is performed with a gradient being set equal to a. In ReLU, the gradient for values less than 0 disappears, and learning may not advance steadily. In leakyReLU, by maintaining the gradient for values less than 0, the above problem is less easily caused. Among leakyReLU (x) described above, PRELU using a parameterized value of a may be used.

Exclusive Processing Between ccALF and ccNN Filter

Figure 8:
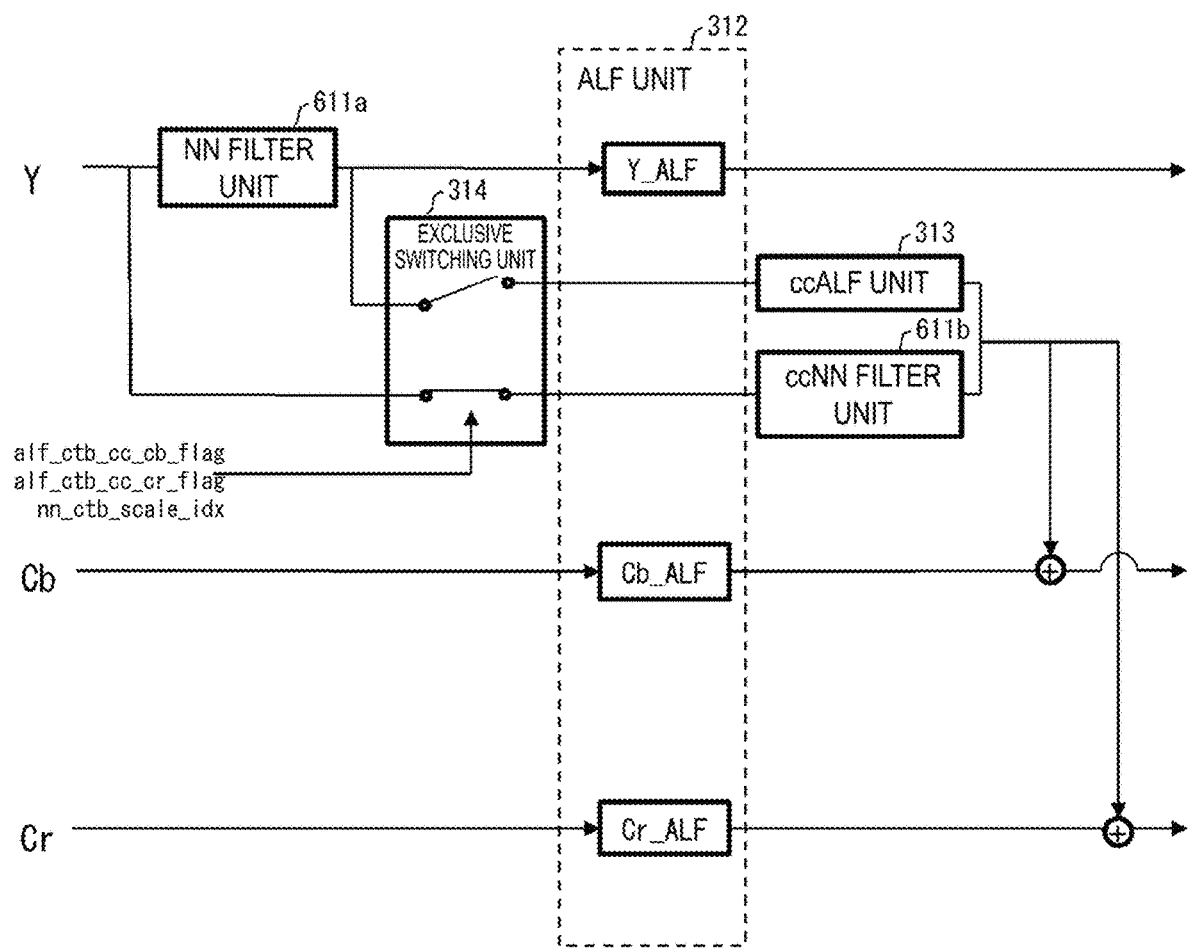
FIG. 8 is a diagram illustrating exclusive switching processing between a ccALF and an NN filter in a loop filter 305.

FIG. 8 is a diagram illustrating exclusive processing between the ccALF unit 313 and a ccNN filter unit 611*b* in the loop filter 305.

A CT information decoder 3201 decodes a flag alf_ctb_cc_cb_flag indicating whether to apply the ccALF to a Cb image in a target region (for example, the CTB) from the coded data, a flag alf_ctb_cc_cr_flag indicating whether to apply the ccALF to a Cr image of the target region, and a parameter nn_ctb_scale_idx[cIdx] indicating whether to apply the ccNN filter to an image of a cIdx component in the target region.

The loop filter 305 of the present configuration includes the ALF unit 312, the ccALF unit 313, an NN filter unit 611*a*, the ccNN filter unit 611*b*, and an exclusive switching unit 314.

The ALF unit 312 includes Y_ALF, Cb_ALF, and Cr_ALF, performs processing using recSamples [cIdx], and outputs a processed image alfPicture [cIdx].

The ccNN filter unit 611*b* derives a correction value corrNN for correcting an error, using correlation between color components using the neural network model. Here, it is referred to as a cross component filter because it inputs a Y component and derives the correction value corrNN. The input image of the ccNN filter unit 611*b* may be the following Y component image recSamples[0].

$$inSamples[0][x][y] = recSamples[0][x][y]$$

Further, a QP image qpMap and bS may be input.

The ccNN filter unit 611*b* derives a chrominance scaling value NNScaleVal from nn_ctb_scale_idx. A correspondence between nn_ctb_scale_idx and the chrominance scaling value NNScaleVal is determined in advance. For example, derivation is performed as follows.

$$NNScaleVal = 0(nn\_ctb\_scale\_idx == 0)$$
$$NNScaleVal = 1(nn\_ctb\_scale\_idx == 1)$$
$$NNScaleVal = 2(nn\_ctb\_scale\_idx == 2)$$

For example, derivation may be performed as follows, using a table NNScaleTbl that stores an array of NNScaleVal with the index of nn_ctb_scale_idx.

$$NNScaleVal = NNScaleTbl[nn\_ctb\_scale\_idx]$$

In a case that nn_ctb_scale_idx is 0, processing in the ccNN filter unit is not performed.

The ccNN filter unit 611*b* scales corrNN using NNScaleVal and derives corrRescale. In the following, cIdx=1, 2.

$$corrNN[x][y] = Func(inSamples[0][x][y], bS, qpMap)$$
$$corrRescale[x][y] = (corrNN[x][y] * NNScaleVal + (1 \ll (shift - 1))) \gg shift$$

Func is a function that derives coreNN from the input image of the ccNN filter unit 611*b*, bS, and qpMap. shift=1 may hold.

By adding the output corrRescale of the ccNN filter unit 611*b* and the output image (for example, an ALF-processed image alfPicture[1][x][y]) of Cb_ALF, a chrominance decoded image sample recSamples[1][x][y] may be obtained. In the following, cIdx=1, 2. recSamples[cIdx][x][y]=alfPicture[cIdx][x][y]+corrRescale[x][y]

Note that, in the configuration in which nn_ctb_flag having binary values is used instead of nn_ctb_scale_idx having three or more values, the following processing is performed.

$$recSamples[cIdx][x][y] = nn\_ctb\_flag[cIdx]\ !==$$
$$0\,?\,alfPicture[cIdx][x][y] + corrNN[x][y]\!:alfPicture[cIdx][x][y]$$

Alternatively, the following may be performed.

In a case that nn_ctb_flag[cIdx]==0, corrNN[x][y]=0
recSamples[cIdx][x][y]=alfPicture[cIdx][x][y]+corrNN[x][y] The ccNN filter unit 611b outputs the result corrRescale obtained by performing processing on the Y image in the neural network model. Subsequently, the output of the ccNN filter unit 611b is added to each of the ALF-processed images of Cb and Cr.

In a case of applying the ccNN filter (nn_ctb_scale_idx is 1 or greater), the exclusive switching unit 314 does not apply the ccALF (sets each of alf_ctb_cc_cb_flag and alf_ctb_cc_cr_flag equal to 0), and applies the ccNN filter unit 611b to recSamples[cIdx]. Conversely, in a case of applying the ccALF (in a case that alf_ctb_cc_cb_flag and alf_ctb_cc_cr_flag are 1), the ccNN is not applied (nn_ctb_scale_idx is set equal to 0), and the ccALF unit 313 is applied to recSamples[cIdx].

Note that it may be implemented as the following operation by the CT information decoder 3201.

In a case that it is indicated that the ccALF is applied (alf_ctb_cc_cb_flag and alf_ctb_cc_cr_flag are 1), nn_ctb_scale_idx[1] and nn_ctb_scale_idx[2] are not decoded from the coded data, and nn_ctb_scale_idx[1] and nn_ctb_scale_idx[2] are set equal to 0. In a case of not being present in the coded data, nn_ctb_scale_idx[1] and nn_ctb_scale_idx[2] are set equal to 0. In a case that alf_ctb_cc_cb_flag and alf_ctb_cc_cr_flag are 0, the ccNN indexes nn_ctb_scale_idx[1] and nn_ctb_scale_idx[2] are decoded from the coded data.

Note that it may be implemented as the following operation by the CT information decoder 3201.

In a case that it is indicated that the ccNN filter is applied (nn_ctb_scale_idx[1] and nn_ctb_scale_idx[2] are 1), alf_ctb_cc_cb_flag and alf_ctb_cc_cr_flag are not decoded from the coded data, and alf_ctb_cc_cb_flag and alf_ctb_cc_ cr_flag are set equal to 0. In a case of not being present in the coded data, alf_ctb_cc_cb_flag and alf_ctb_cc_cr_flag are set equal to 0. In a case that nn_ctb_scale_idx[1] and nn_ctb_scale_idx[2] are 0, alf_ctb_cc_cb_flag and alf_ctb_cc_cr_flag are decoded from the coded data.

In the above, in the ccNN flag nn_ctb_flag and the ccALF flags alf_ctb_cc_cb_flag and alf_ctb_cc_cr_flag indicating application of the ccALF to Cb and Cr, only one of nn_ctb_flag or alf_ctb_cc_cb_flag and alf_ctb_cc_cr_flag is decoded, and in a case that one of them is 1 or greater, the other is set equal to 0, and the exclusive processing is thereby implemented. Here, nn_ctb_flag is a flag for controlling application of the ccNN, and is a flag having binary values of 0 or 1. Decoding is performed in the nn_ctb_flag header decoder 3020.

According to the configuration described above, there is an effect that only the filter that is the more effective among the ccALF and the ccNN filter can be selected and processing can be performed for each region. This is exclusive and can therefore reduce the amount of processing.

Exclusive Processing between ccALF and NN Filter

Figure 9:
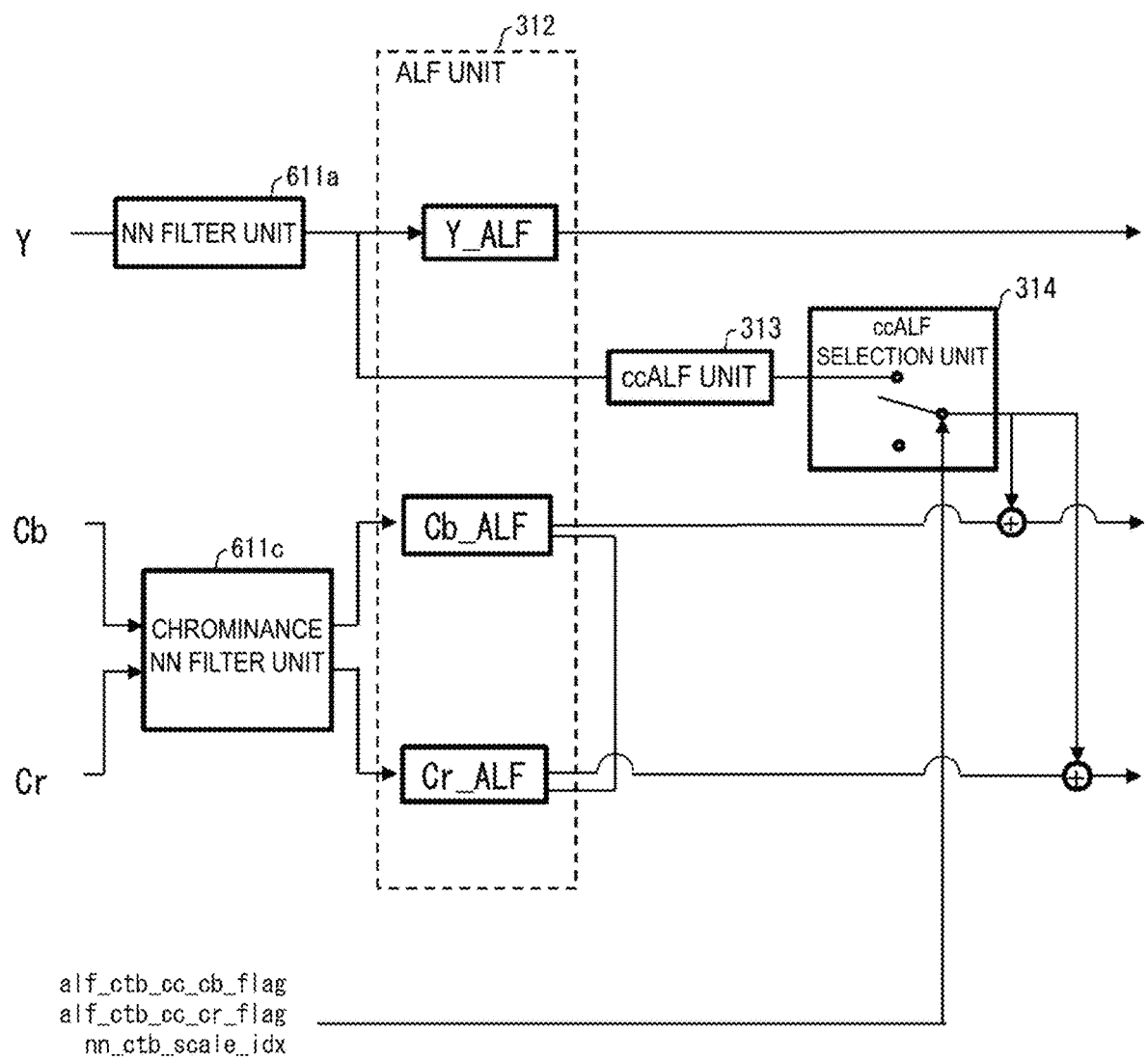
FIG. 9 is a diagram illustrating processing in a case that ccNN is derived with chrominance in the loop filter 305.

FIG. 9 is a diagram illustrating processing in which the NN filter is used for chrominance in the loop filter 305.

An NN filter unit 611c at least inputs the Cb and Cr images recSamples[cIdx] (cIdx=1, 2), performs processing of using correlation between the components, and outputs each of the Cb and Cr images. The input image inSamples of the NN filter unit 611c may be the following color component image recSamples[cIdx], and the output may be recSamples[cIdx] subjected to NN filtering.

$$inSamples[0][x][y] = recSamples[1][x][y]$$
$$inSamples[1][x][y] = recSamples[2][x][y]$$
$$inSamples[2][x][y] = bS[x][y]$$

For the Y component, the ALF unit 312 performs filtering processing on the output image of the NN filter unit 611a, and for the Cb and Cr components, the ALF unit 312 performs filtering processing on the output image from the chrominance NN filter unit 611c.

corrNN[x][y]=Func(inSamples[k][x][y]) (k=0 . . . 2)

Func is a function that derives coreNN from the input image of the ccNN filter unit 611c.

coreNN is added to the Cb and Cr images recSamples[cIdx].

recSamples[cIdx]=recSamples[cIdx]+corrNN[x][y]

The ALF unit 312 applies the ALF processing to the input image recSamples[cIdx] of the color component cIdx with alf_ctb_flag[cIdx] of other than 0, and outputs alfPicture[cIdx].

A ccALF selection unit 314 determines whether to add the output sum of the ccALF unit 313 to the ALF output image alfPicture[cIdx] of Cb and Cr from values of alf_ctb_cc_cb_flag and alf_ctb_cc_cr_flag and nn_ctb_scale_idx. In a case that the value of nn_ctb_scale_idx is 1 or greater, the ccALF selection unit 314 sets each of the values of alf_ctb_cc_cb_flag and alf_ctb_cc_cr_flag equal to 0 and does not add the output from the ccALF unit 313, and in a case that the values of alf_ctb_cc_cb_flag and alf_ctb_cc_cr_flag are 1, the ccALF selection unit 314 sets the value of nn_ctb_scale_idx equal to 0 and adds the output from the ccALF unit 313.

Figure 10:
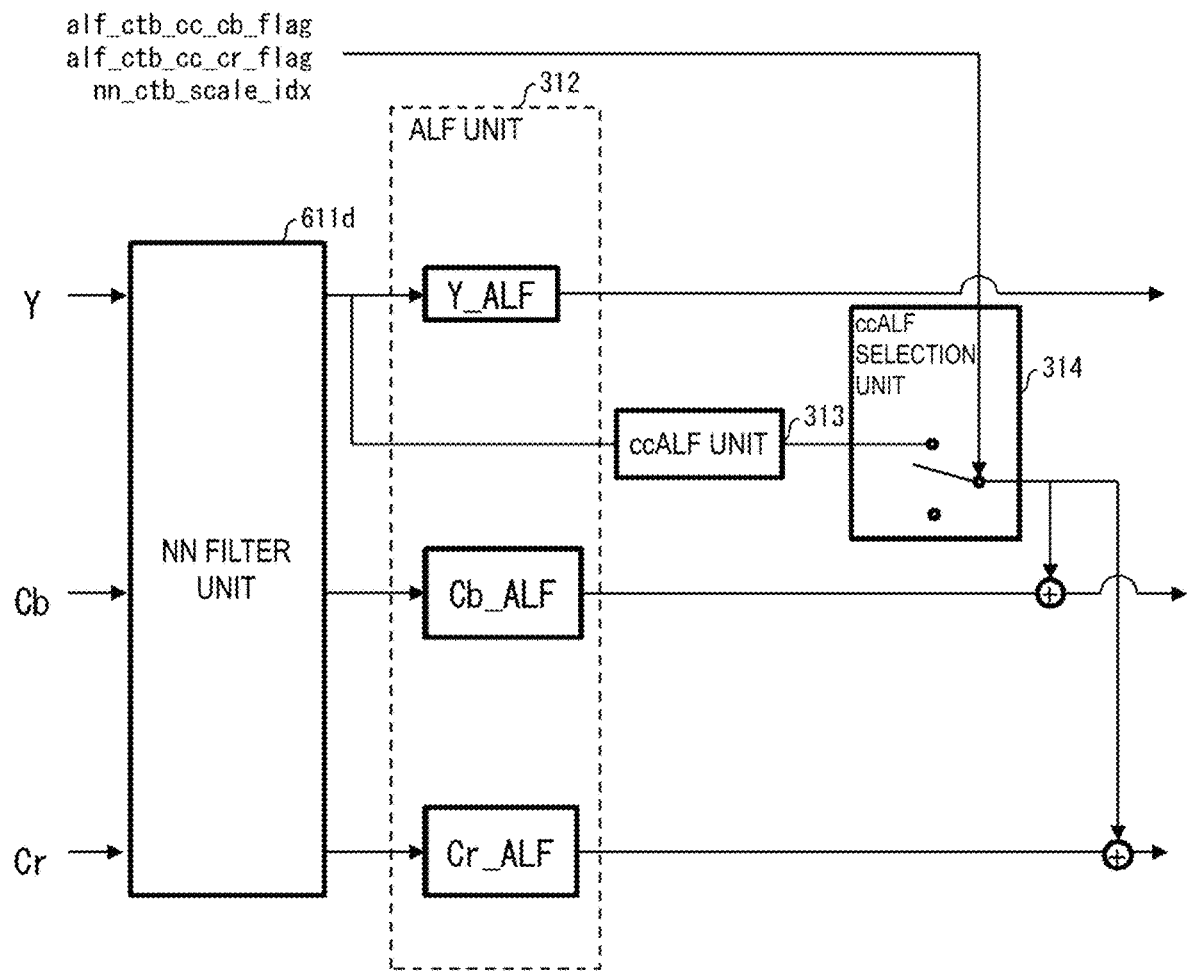
FIG. 10 is a diagram illustrating processing in a case that an NN filter unit 611d uses each of Y, Cb, and Cr components of an input image in the loop filter 305.

FIG. 10 is a diagram illustrating processing of a case that an NN filter unit 611d uses each of the Y, Cb, and Cr components of the input image in the loop filter 305.

Using the input image, the NN filter unit 611d outputs the image subjected to processing in the neural network model using each of the components.

The NN filter unit 611d performs processing on the input image resSamples[cIdx] (cIdx=0 . . . 2) including Y, Cb, and Cr in the neural network model, and derives corrNN[cIdx]. Then, scaling is performed using nn_ctb_scale_idx[cIdx], and the result is added to the input image.

corrNN[x][y]=Func(inSamples[cIdx][x][y])

NNScaleVal=NNScaleTbl[nn_ctb_scale_idx[cIdx]]

corrRescale[x][y]=(corrNN[x][y]*NNScaleVal+(1<<(shift−1))>>shift recSamples[cIdx][x][y]=resSamples[cIdx][x][y]+corrRescale[x][y]

Func is a function that derives coreNN from the input image of the ccNN filter unit 611*d*. shift=1 and cIdx=0 . . . 2 may hold.

The input image inSamples of the NN filter unit 611*d* may be recSamples[cIdx], and the output may be corrNN[cIdx]. cIdx=0 . . . 2.

inSamples[0][x][y]=recSamples[0][x][y]

inSamples[1][x][y]=recSamples[1][x][y]

inSamples[2][x][y]=recSamples[2][x][y]

Further, a QP image qpMap and bS may be input.

inSamples[3][x][y]=qpMap[x][y]

inSamples[4][x][y]=bS[x][y]

The ALF unit 312 outputs the image alfPicture[cIdx] subjected to the ALF processing, using the processed image recSamples[cIdx] in the NN filter unit 611*d* for each component.

The ccALF selection unit 314 determines whether to add the output of the ccALF unit 313 to the ALF output image alfPicture[cIdx] (cIdx=1, 2) of Cb and Cr from the values of alf_ctb_cc_cb_flag and alf_ctb_cc_cr_flag and nn_ctb_scale_idx decoded by the CT information decoder 3201.

In a case that the value of nn_ctb_scale_idx is 1 or greater, the ccALF selection unit 314 sets each of the values of alf_ctb_cc_cb_flag and alf_ctb_cc_cr_flag equal to 0 and does not add the output from the ccALF unit 313, and in a case that the values of alf_ctb_cc_cb_flag and alf_ctb_cc_cr_flag are 1, the ccALF selection unit 314 sets the value of nn_ctb_scale_idx equal to 0 and adds the output from the ccALF unit 313.

Other Configuration Example 1

FIG. 11 is a diagram illustrating syntax for performing exclusive switching of flags of the ccALF and the NN filter in the target picture (target slice).

In SYN0001, in a case that a flag (NN flag) sps_nn_enabled_flag indicating whether the NN filter is available is 1, the header decoder 3020 decodes a flag sh_nn_enabled_flag indicating whether to apply the NN filter to the target picture (target slice) from the coded data. In a case that sh_nn_enabled_flag is 1 and there is a chrominance component in the input image, the header decoder 3020 decodes a flag sh_nn_chroma_enabled_flag indicating whether to apply the NN filter to the chroma images (Cb and Cr images) of the target picture (target slice).

In SYN0003, in a case that sh_nn_chroma_enabled_flag is 0 and a flag sps_ccalf_enabled_flag indicating whether the ccALF is available is 1 (available), the header decoder 3020 decodes each of flags sh_alf_cc_cb_enabled_flag and sh_alf_cc_cr_enabled_flag indicating whether to apply the ccALF to the target picture (target slice). Otherwise (in a case that sh_alf_cc_cb_enabled_flag is not present), 0 (no application) is derived for each of sh_alf_cc_cb_enabled_flag and sh_alf_cc_cr_enabled_flag (sh_alf_cc_cr_enabled_flag).

Further, in a case that each of sh_alf_cc_cb_enabled_flag and sh_alf_cc_cr_enabled_flag is 1, the header decoder 3020 decodes each of indexes sh_alf_cc_cb_aps_id and sh_alf_cc_cr_aps_id indicating the filter coefficient of the ccALF for the Cb image or the Cr image.

Other Configuration Example 2

FIG. 12 is a diagram illustrating syntax for performing exclusive switching of the ccALF and the NN filter in the target region (here, the CTU).

(SYN0011) In a case that sh_nn_enabled_flag decoded from the coded data (for example, the slice header) is 1, nn_ctb_flag[0] is decoded, and in a case that nn_ctb_flag[0] is other than 0, an index nn_luma_fixed_filter_idx indicating the neural network model to be used for a luminance NN filter is decoded. nn_luma_fixed_filter_idx is used in an NN model selection unit 323. The NN model selection unit 323 switches the neural network model (neural network parameter) to be used in the NN filter unit 611 to a parameter indicated by nn_luma_fixed_filter_idx.

(SYN0012) In a case that sh_nn_chroma_enabled_flag decoded by the header decoder 3020 is 1, the CT information decoder 3021 decodes each of the scale indexes nn_ctb_scale_idx[1] and nn_ctb_scale_idx[2] indicating a degree of application of the NN filter to be applied to the Cb image and the Cr image in the target region (CtbAddrX, CtbAddrY). nn_ctb_scale_idx is a parameter with three or more values having values of 0, 1, . . . , N−1, and is used to scale the pixel value of chrominance on a scale corresponding to the value of each index. In a case that the value of the index is 0, processing by the NN filter is not performed.

(SYN0013) In a case that the NN filter is applied to the target region (in a case that nn_ctb_scale_idx[1] and nn_ctb_ scale_idx[2] have a value indicating application, which is greater than 0), the CT information decoder 3021 decodes each of indexes nn_cb_fixed_filter_idx and nn_cr_fixed_filter_idx indicating the NN model to be used for the NN filter of Cb and Cr.

(SYN0014A) In a case that the ccALF is applied to the target picture/slice but the NN is not applied to the Cb image of the target region (sh_alf_cc_cb_enabled_flag is 1 and nn_ctb_scale_idx[1] is 0), the CT information decoder 3021 decodes the flag alf_ctb_cc_cb_flag indicating whether to apply the ccALF to the Cb image in the target region. Otherwise (in a case that alf_ctb_cc_cb_flag is not present), 0 (no application) is inferred for alf_ctb_cc_cb_flag.

(SYN0015A) In a case that alf_ctb_cc_cb_flag is 1 (a value indicating application), the CT information decoder 3021 decodes a filter index alf_ctb_cc_cb_idc of the ccALF of Cb.

(SYN0014B) In a case that sh_alf_cc_cr_enabled_flag is 1 and nn_ctb_scale_idx[2] is 0, the CT information decoder 3021 decodes the flag alf_ctb_cc_cr_flag indicating whether to apply the ccALF to the Cr image in the target region. Otherwise (in a case that alf_ctb_cc_cr_flag is not present), 0 (no application) is inferred for alf_ctb_cc_cr_flag.

(SYN0015B) In a case that alf_ctb_cc_cr_flag is 1, the CT information decoder 3021 decodes a filter index alf_ctb_cc_cr_idc of the ccALF of Cr.

Other Configuration Example 3

FIG. 13 is a diagram illustrating syntax for performing exclusive switching of the ccALF and the NN filter in the target region (for example, the CTU). An NN flag nn_ctb_flag[0] indicating whether to apply the NN filter to the Y image in the target region is decoded.

(SYN0022) In a case that sh_nn_chroma_enabled_flag decoded by the header decoder 3020 is 1, the CT information decoder 3021 decodes each of the NN flags nn_ctb_flag[1] and nn_ctb_flag[2] indicating whether to apply the NN filter to the Cb and Cr images in the target region. nn_ctb_flag is a binary flag, and in a case that the value is 1, the NN filter is performed at (CtbAddrX, CtbAddrY), and in a case that the value is 0, the NN filtering is not performed.

(SYN0024A) In a case that sh_alf_cc_cb_enabled_flag is 1 and the NN flag nn_ctb_flag[1] of Cb is 0, the CT information decoder 3021 decodes the flag alf_ctb_cc_cb_flag indicating whether to apply the ccALF to the Cb image in the target region. Otherwise (in a case that alf_ctb_cc_cb_flag is not present), 0 (no application) is inferred for alf_ctb_cc_cb_flag.

(SYN0025A) In a case that alf_ctb_cc_cb_flag is 1, the CT information decoder 3021 decodes the filter index alf_ctb_cc_cb_idc of the ccALF of Cb.

(SYN0024B) In a case that sh_alf_cc_cr_enabled_flag is 1 and the NN flag nn_ctb_scale_idx[2] of Cr is 0, the CT information decoder 3021 decodes the flag alf_ctb_cc_cr_flag indicating whether to apply the ccALF to the Cr image in the target region. Otherwise (in a case that alf_ctb_cc_cr_flag is not present), 0 (no application) is inferred for alf_ctb_cc_cr_flag.

(SYN0025B) In a case that alf_ctb_cc_cr_flag is 1, the CT information decoder 3021 decodes the filter index alf_ctb_cc_cr_idc of the ccALF of Cr.

Exclusive Switching between ALF and NN Filter

Figure 14:
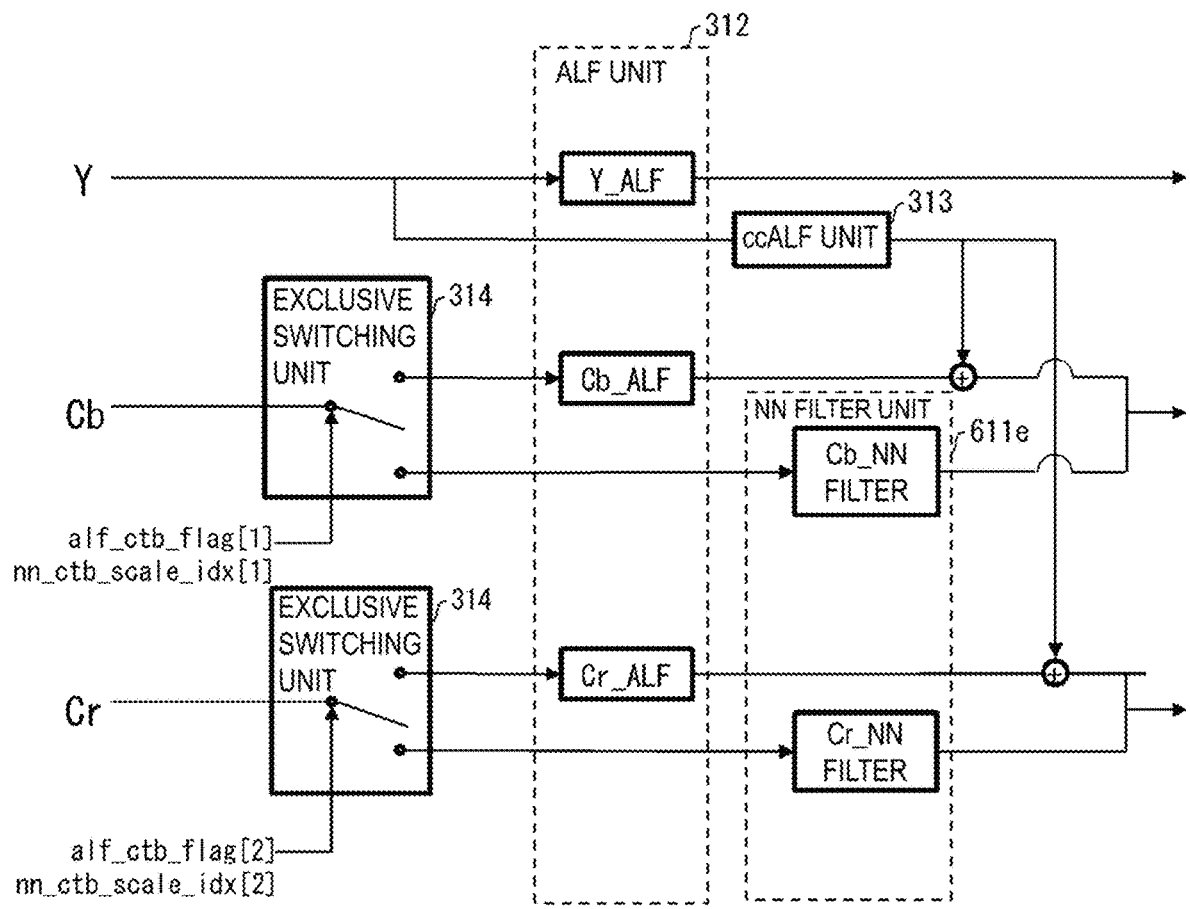
FIG. 14 is a diagram illustrating exclusive switching processing between an ALF and the NN filter in the loop filter 305.

FIG. 14 is a diagram illustrating exclusive switching processing between the ALF unit 312 and an NN filter unit 611e in the target region (for example, the CTU).

The loop filter 305 of the present configuration includes the ALF unit 312, the ccALF unit 313, the NN filter unit 611e, and the exclusive switching unit 314, performs processing using an unprocessed image for each of the color components of Y, Cb, and Cr, alf_ctb_flag, and nn_ctb_scale_idx, and outputs a processed image for each of the color components of Y, Cb, and Cr.

The same description as that given above applies to the ALF unit 312 and the ccALF 313 unit, and thus description thereof will be omitted.

The NN filter unit 611e derives each of the results obtained by performing processing on the input image resSamples[cIdx] of Cb (cIdx=1) or Cr (cIdx=2) in the neural network model as the correction value corrNN, performs scaling using nn_ctb_scale_idx[cIdx], and adds to the input image of Cb or Cr. The NN filter unit 611e includes a Cb_NN filter and a Cr_NN filter, and the Cb_NN filter outputs an image obtained by performing processing using the Cb image, and the Cr_NN filter outputs an image obtained by performing processing using the Cr image.

$$corrNN[cIdx][x][y]=Func(recSamples[cIdx][x][y])$$

$$NNScaleVal=NNScaleTbl[nn\_ctb\_scale\_idx[cIdx]]$$

$$corrRescale[x][y]=(corrNN[Idx][x][y]*NNScaleVal+(1<<(shift-1)))>>shift$$

$$recSamples[cIdx][x][y]=resSamples[cIdx][x][y]+corrRescale[x][y]$$

Func is a function that derives coreNN from the input image of the ccNN filter unit 611e. shift=1 and cIdx=1, 2 may hold.

The input image of the NN filter unit 611e may be set equal to inSamples, and the following color component image recSamples may be used.

$$inSamples[0][x][y]=recSamples[1][x][y]$$

or $$inSamples[0][x][y]=recSamples[2][x][y]$$

Using the input image and the value of each of alf_ctb_flag and nn_ctb_scale_idx, in a case that nn_ctb_scale_idx is 1 or greater, the exclusive switching unit 314 applies the NN filter unit 611e to the input image, and in a case other than the above (nn_ctb_scale_idx==0) and that alf_ctb_flag is 1, the exclusive switching unit 314 applies the ALF unit 312 to the input image.

In a case that alf_ctb_flag is 1, the exclusive switching unit 314 applies the ALF unit 312 to the input image, and in a case other than the above (alf_ctb_flag==0) and that nn_ctb_scale_idx is 1 or greater, the exclusive switching unit 314 applies the NN filter unit 611e to the input image.

FIG. 15 is a diagram illustrating syntax for performing exclusive switching of flags of a chrominance ALF and the NN filter in the slice header.

In SYN0031, in a case that the flag sps_nn_enabled_flag indicating whether to apply the NN filter is 1, the header decoder 3020 decodes sh_nn_enabled_flag.

In SYN0032, in a case that sh_nn_enabled_flag is 1 and there is a chrominance component in the input image, the header decoder 3020 decodes the flag sh_nn_chroma_enabled_flag indicating whether to apply the chrominance NN filter.

In SYN0033, in a case that sh_nn_chroma_enabled_flag is 0 and there is a chrominance component in the input image, the header decoder 3020 decodes each of flags sh_alf_cb_enabled_flag and sh_alf_cr_enabled_flag indicating whether to apply the ALF to each of the Cb and Cr components.

FIG. 16 is a diagram illustrating syntax for performing exclusive switching of alf_ctb_flag and nn_ctb_scaleidx in the CTU.

In a case that sh_nn_enabled_flag is 1, the CT information decoder 3021 decodes nn_ctb_flag.

In SYN0041, in a case that sh_nn_enabled_flag decoded by the header decoder 3020 is 1 and nn_ctb_flag is other than 0, the CT information decoder 3021 decodes a luminance NN model index nn_luma_fixed_filter_idx.

In SYN0042, in a case that sh_nn_chroma_enabled_flag decoded by the header decoder 302 is 1, the CT information decoder 3021 decodes each of the scale indexes nn_ctb_scale_idx[1] and nn_ctb_scale_idx[2] of Cb and Cr at the position (CtbAddrX, CtbAddrY) of the CTU. nn_ctb_scale_idx[ ] is a parameter with three or more values having values of 0, 1, . . . , N−1, and is used to scale the pixel value of chrominance on a scale corresponding to the value of each index. In a case that the value of the index is 0, processing by the NN filter is not performed.

In SYN0043, in a case that each of nn_ctb_scale_idx[1] and nn_ctb_scale_idx[2] is greater than 0,
  the CT information decoder 3021 decodes each of the indexes nn_cb_fixed_filter_idx and nn_cr_fixed_filter_idx of the NN filter of Cb and Cr.

In SYN0044A, in a case that sh_alf_cb_enabled_flag decoded by the header decoder 3020 is 1 and nn_ctb_scale_idx[1] is 0, the CT information decoder 3021 decodes the ALF flag alf_ctb_flag[1] of Cb at the position (CtbAddrX, CtbAddrY) of the CTU. Otherwise, alf_ctb_flag[1] is not decoded and is set equal to 0. In other words, in a case that alf_ctb_flag[1] is not present, 0 is inferred.

In SYN0045A, in a case that alf_ctb_flag[1] is 1, the CT information decoder 3021 decodes an ALF filter index alf_ctb_filter_alt_idx[1] of Cb.

In SYN0044B, in a case that sh_alf_cr_enabled_flag decoded by the header decoder 3020 is 1 and nn_ctb_scale_idx[2] is 0, the CT information decoder 3021 decodes the ALF flag alf_ctb_flag[2] of Cr at the position (CtbAddrX, CtbAddrY) of the CTU. Otherwise, alf_ctb_flag[2] is not decoded and is set equal to 0. In other words, in a case that alf_ctb_flag[2] is not present, 0 is inferred.

In SYN0045, in a case that alf_ctb_flag[2] is 1, the CT information decoder 3021 decodes an ALF filter index alf_ctb_filter_alt idx[2] of Cr.

FIG. 17 is a diagram illustrating syntax for performing exclusive switching of the ALF flags and the NN flags in the CTU.

A difference from the syntax of FIG. 16 lies in that nn_ctb_flag is decoded instead of nn_ctb_scale_idx.

In a case that sh_nn_enabled_flag is 1, the CT information decoder 3021 decodes nn_ctb_flag[0].

In SYN0052, in a case that sh_nn_chroma_enabled_flag decoded by the header decoder 3020 is 1, the CT information decoder 3021 decodes each of the NN flags nn_ctb_flag[1] and nn_ctb_flag[2] of Cb and Cr at the position (CtbAddrX, CtbAddrY) of the CTU. nn_ctb_flag is a binary flag having values of 0 and 1, and in a case that the value is 1, the NN filtering is performed at (CtbAddrX, CtbAddrY), and in a case that the value is 0, the NN filtering is not performed.

In SYN0054A, in a case that sh_alf_cb_enabled_flag decoded by the header decoder 3020 is 1 and nn_ctb_flag[1] is 0, the CT information decoder 3021 decodes alf_ctb_flag[1] being the ALF flag of Cb at the position (CtbAddrX, CtbAddrY) of the CTU. Otherwise, in a case that alf_ctb_flag[1] is not present, 0 is inferred.

In SYN0055A, in a case that alf_ctb_flag[1] is 1, the CT information decoder 3021 decodes the ALF filter index alf_ctb_filter_alt idx[1] of Cb.

In SYN0054B, in a case that sh_alf_cr_enabled_flag decoded by the header decoder 3020 is 1 and nn_ctb_flag[2] is 0, the CT information decoder 3021 decodes alf_ctb_flag[2] being the ALF flag of Cr at the position (CtbAddrX, CtbAddrY) of the CTU. Otherwise, in a case that alf_ctb_flag[2] is not present, 0 is inferred.

In SYN0055B, in a case that alf_ctb_flag[2] is 1, the CT information decoder 3021 decodes the ALF filter index alf_ctb_filter_alt idx[2] of Cr.

NN Model Switching by Different Model and Layer

Switching the NN model to be used in the NN filter unit depending on a sequence, a picture, or a local feature of a picture enables performing of effective filtering processing in a relatively small-scale NN model; however, NN model switching requires memory transfer, and it is difficult to switch the entirety of a large-scale NN model. The following will describe a configuration in which the entire NN model or many layers are switched at a relatively large first level (granularity, range, image region, coded data region), and a part of the NN model (a part of the layers) is switched at a smaller second level. The following will describe an example in which the first level is a slice level and the second level is a CTU level, but this is not restrictive. A sequence, a picture, or a sub-picture may be used for the first level, and a CT or a CU, which is obtained by further splitting the CTU, may be used for the second level.

FIG. 19 is a diagram illustrating an example of a syntax table of NN model indexes in the slice header.

In SYN0101, in a case that the flag sps_nn_enabled_flag indicating whether to apply the NN filter which is decoded by the header decoder 3020 is 1, the header decoder 3020 decodes sh_nn_enabled_flag.

In SYN0102, in a case that sh_nn_enabled_flag is 1, the header decoder 3020 decodes an index sh_nn_luma_fixed_filter_idx of a luminance model selected in the NN model selection unit 323.

In SYN0103, in a case that there is a chrominance component in the input image, the header decoder 3020 decodes the flag sh_nn_chroma_enabled_flag indicating whether to apply the chrominance NN filter.

In SYN0104, in a case that sh_nn_chroma_enabled_flag is 1, each of indexes sh_nn_cb_fixed_filter_idx and sh_nn_cr_fixed_filter_idx of a chrominance model selected in the NN model selection unit 323 is decoded.

FIG. 20 is a diagram illustrating an example of a syntax table of NN partial model indexes in the CTU.

In SYN0111, in a case that the flag sh_nn_enabled_flag indicating whether the NN filter is available which is decoded in the slice header is 1, the CT information decoder 3021 decodes an index nn_part_filter_idx[0] of a partial model of the luminance model at the position (CtbAddrX, CtbAddrY) of the CTU.

In SYN0112, in a case that the flag sh_nn_chroma_enabled_flag indicating whether the chrominance NN filter is available which is decoded by the header decoder 3020 is 1, the CT information decoder 3021 decodes each of indexes nn_part_filter_idx[1] and nn_part_filter_idx[2] of the partial model of the Cb and Cr models at the position (CtbAddrX, CtbAddrY) of the CTU.

Figure 18:
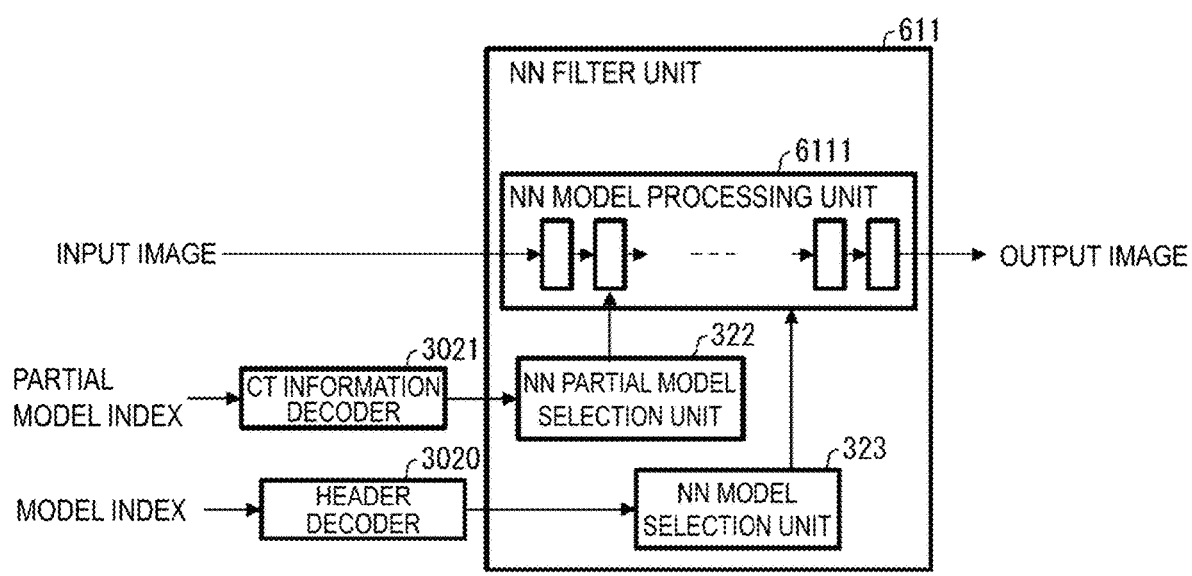
FIG. 18 is a diagram illustrating NN model switching in a slice and partial model switching in the CTU.

FIG. 18 is a diagram illustrating NN model switching in a first region (for example, a sequence, a picture group, a picture, a slice) and partial model switching in a second region (for example, a CTU) smaller than the first region.

The NN filter unit 611 includes an NN model processing unit 6111, an NN partial model selection unit 322, and the NN model selection unit 323.

The NN model processing unit 6111 performs filtering processing, using the neural network model indicated for the input image.

The NN model selection unit 323 selects one NN model out of multiple NN model candidates prepared in advance, based on the NN model index nn_luma_fixed_filter_idx. The NN filter unit 611 (NN model processing unit 6111) performs filtering processing, using the selected NN model. Note that both of the topology and the parameters (weights and biases) of the neural network may be switched, or only the parameters of the neural network may be switched.

For example, the NN model selection unit 323 may derive the parameters of the neural network.

NNModel[$i$]=NNFixedModel[nn_luma_fixed_filter_idx][$i$]

Here, NNModel is a parameter of the neural network used in the NN filter unit, and NNFixedModel is a parameter of the neural network indicated by nn_luma_fixed_filter_idx, where i=0 . . . number of parameters−1.

nn_luma_fixed_filter_idx is a non-negative integer value of 0 . . . N−1 (N is a total number of model candidates), and each of the numbers is associated with an individual corresponding NN model.

The NN partial model selection unit 322 replaces parameters of a part of the layers (hereinafter, the partial model) of the NN model, based on an NN partial model index nn_luma_part_filter_idx. For example, only a specific part of the parameters is relearned (finetuned) depending on a specific genre, quantization parameter, or bit rate, and the specific part of parameters are stored in the video decoding apparatus and the video coding apparatus (NN filter unit 611) as a selectable candidate NNSubFixedModel. The NN partial model selection unit 322 derives (replaces) a parameter having a specific value of NNModel, using NNSubFixed-Model selected by nn_luma_part_filter_idx.

NNModel[j]=NNSubFixedModel[nn_luma_part_filter_idx][j]

Here, j=nnStartIdx . . . nnEndIdx. Here, nnStartIdx and nnEndIdx indicate a start position and an end position of a parameter to be switched among the parameters of NNModel. Note that nnStartIdx>=0 and nnEndIdx<=number of parameters−1.

A range of the parameters of the NN model to be switched may be an input layer, or may be an intermediate layer or an output layer.

The NN partial model index is a non-negative integer value of 0 . . . M−1 (M is a total number of layer candidates), and each of the numbers is associated with an individual corresponding partial model candidate.

Through the processing, the model is adaptively switched for each small block, without all of the network parameters being switched. This can reduce load time for the neural network parameters related to parameter switching in a small block (second region).

Configuration for Enabling Individual Setting of Block Strength Coefficient for NN Filter and DF By using information bS related to the block boundary in the NN filter, a degree of application of the NN filter can be changed depending on a bS value. bS is a parameter derived from a CU/TU/PU boundary, a residual of a TU, a mode of a PU, a PU image itself, a pixel value of the block boundary, or a motion vector, for example. In the DF, a degree of application of the DF is also controlled depending on the bS value.

The following will describe an example in which parameters (beta and tC) for controlling derivation of bS are decoded with the coded data, and the degrees of application of the NN and the DF are controlled with an encoder. In the present example, beta and tC offsets different for the NN and the DF are transmitted, and are individually decoded in the header decoder 3020.

Figure 21:
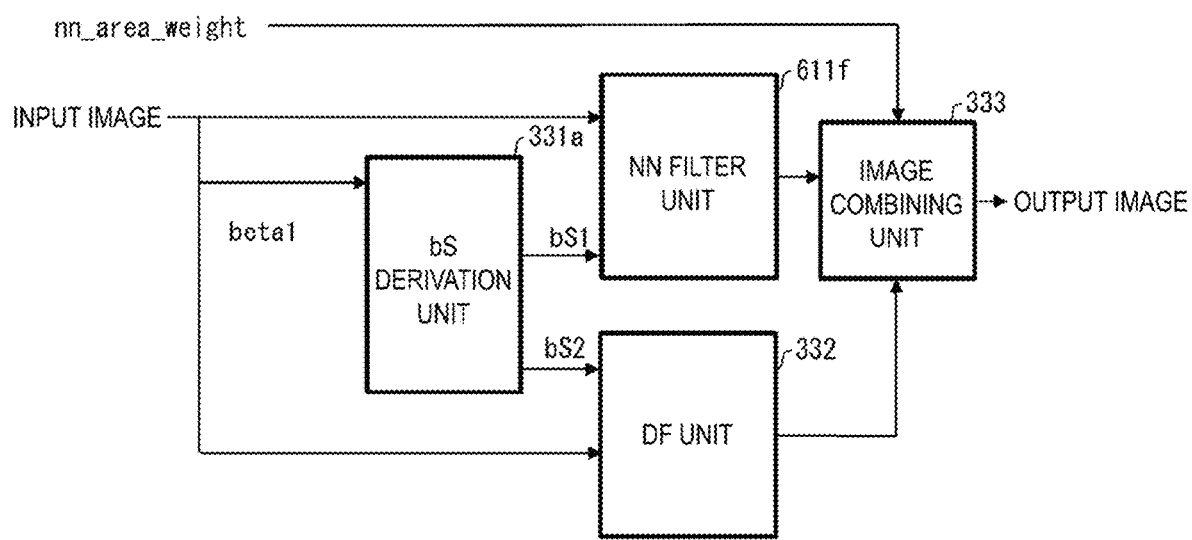
FIG. 21 is a diagram illustrating processing of deriving bS, using parameters for bS calculation used in the NN filter and the Deblocking Filter (DF).

FIG. 21 is a diagram illustrating processing of deriving bS, using parameters for bS calculation used in the NN filter and the DF.

A bS derivation unit 331*a* calculates bS for the NN and bS for the DF, using the parameters beta and tC decoded from the coded data, and inputs bS for the NN and bS for the DF to an NN filter unit 611*f* and a DF unit 332, respectively.

The parameter beta is a threshold for a range of filtering application from the block boundary. The parameter tC is a maximum value of an amount of variation after filtering for a certain pixel value, and is used to clip a filtering pixel value.

beta and tC increase in conjunction with QP, and can produce a stronger filtering effect in a case of a high QP value in comparison with a low QP value.

The bS derivation unit 331*a* derives beta1 and tC1 from parameters for the NN filter sh_nn_luma_beta_offset_div2 and sh_nn_luma_tc2_offset_div2, and derives bS1, using beta1 and tC1. Derived bS1 is used as the bS value for the NN filter unit 611*f*.

The bS derivation unit 331*a* derives parameters for the DF slice_luma_beta_offset_div2, slice_luma_tc2_offset_div2beta2, and tC2, which are different from the parameters for the NN filter, and calculates bS (hereinafter, bS2), using beta2, tC2, and the input image. Derived bS2 is used as the bS value for the DF unit 332.

Note that, in a case of chrominance, the bS derivation unit 331*a* derives bS1 for Cr from parameters for the NN filter sh_nn_cr_beta_offset_div2 and sh_nn_cr_tc2_offset_div2. bS1 for Cb is derived from sh_nn_cb_beta_offset_div2 and sh_nn_cb_tc2_offset_div2. Derived bS1 is used as the bS value for the NN filter unit 611*f*.

The bS derivation unit 331*a* calculates bS for Cr (hereinafter, bS2), using parameters for the DF slice_cr_beta_offset_div2 and slice_cr_tc2_offset_div2 and the input image. bS for Cb (hereinafter, bS2) is calculated using slice_cb_beta_offset_div2, slice_cb_tc2_offset_div2, and the input image. Derived bS2 is used as the bS value for the DF unit 332.

The DF unit 332 is a filter for performing filtering processing depending on the bS value derived in the bS derivation unit 331*a*, and has an effect of reducing deblocking noise.

The NN filter unit 611*f* is an NN filter for processing the input image recSamples before being subjected to the DF depending on the bS value derived in the bS derivation unit 331*a*, and has an effect of reducing deblocking noise generated at the block boundary in prediction and transform.

The NN filter unit 611*f* may input the output parameter bS[ ][ ] of the bS derivation unit 331*a*, and perform neural network processing. Alternatively, bS may be used as a part (one channel) of the input image of the NN filter unit 611.

The output bS of the bS derivation unit 331*a* may also be used as the image to be input to the NN filter unit 611. For example, it may be used as one of the channels of the image. In other words, for example, the following may be derived in x=xCb . . . xCb+width−1 and y=yCb . . . yCb+height−1 where top left coordinates of a target block are represented by (xCb, yCb), the width thereof is represented by width, and the height thereof is represented by height.

inSamples[0][x][y]=recSamples[cIdx][x][y]

inSamples[1][x][y]=bS[x][y]

Although the above has described independent processing for Y, Cb, and Cr, the NN filter unit 611*f* may input all of Y, Cb, and Cr and perform filtering processing as follows.

inSamples[0][x][y]=recSamples[0][x][y]

inSamples[1][x][y]=recSamples[1][x][y]

inSamples[2][x][y]=recSamples[2][x][y]

inSamples[3][x][y]=bS[x][x]

The NN filter unit 611*f* may input Cb and Cr and perform filtering processing.

inSamples[0][x][y]=recSamples[1][x][y]

inSamples[1][x][y]=recSamples[2][x][y]

inSamples[2][x][y]=bS[x][y]

Further, the QP image qpMap may be input.

inSamples[2][x][y]=qpMap[x][y]

Here, cIdx represents a color component index. inSamples represents an input image of the NN filter unit 611. A bS image may be used in a configuration of adding (concat) to a feature of an intermediate layer.

FIG. 23 is a diagram illustrating syntax of parameters for bS calculation of the NN filter. These are transmitted separately from the parameters (slice_luma_beta_offset_div2, slice_luma_tc_offset_div2, and the like) of the DF unit 332.

In SYN0201, in a case that the flag sps_nn_enabled_flag indicating whether the NN filter is available which is decoded from sps is 1, the header decoder 3020 decodes sh_nn_enabled_flag.

In SYN0202, in a case that sh_nn_enabled_flag is 1, the header decoder 3020 decodes each of luma parameters for bS calculation sh_nn_luma_beta_offset_div2 and sh_nn_luma_tc_offset_div2 to be used in the NN filter unit 611*f*.

In SYN0203, in a case that there is a chrominance component in the input image, the header decoder 3020 decodes the flag sh_nn_chroma_enabled_flag indicating whether the chrominance NN filter is available from the coded data.

In SYN0204, in a case that sh_nn_chroma_enabled_flag is 1, the header decoder 3020 decodes each of Cb and Cr parameters for bS calculation sh_nn_cb_beta_offset_div2, sh_nn_cb_tc_offset_div2, sh_nn_cr_beta_offset_div2, and sh_nn_cr_tc_offset_div2 to be used in the NN filter unit.

Configuration of Transmitting Difference Value

Figure 22:
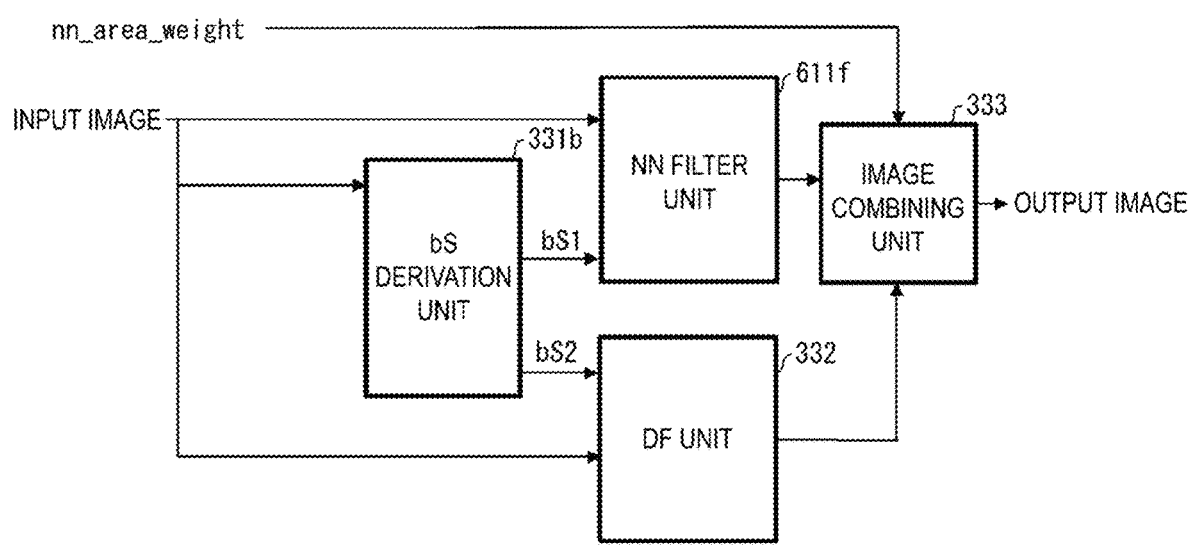
FIG. 22 is a diagram illustrating processing of inputting the parameters for bS calculation used in the DF as a difference from the parameters for bS calculation used in the NN filter and deriving bS.

FIG. 22 is a diagram illustrating processing of inputting the parameters for bS calculation used in the DF as a difference from the parameters for bS calculation used in the NN filter and deriving bS. Here, an example is given in which, instead of transmitting slice_luma_beta_offset_div2 and the like for the DF and slice_nn_luma_beta_offset_div2 and the like for the NN filter, difference syntax elements between the parameters of one filter and the parameters of another filter are transmitted.

The parameter decoder 3020 (which may be a bS derivation unit 331*b*) derives bS1, using the parameters for the NN filter beta and tC (=beta1, tC1=sh_nn_luma_beta_offset_div2, sh_nn_luma_tc2_offset_div2), and inputs to the NN filter unit 611*f*. The parameters for the DF (beta2 and tC2) are calculated from parameter differences for the DF beta_diff and tc_diff and the parameters for the NN filter sh_nn_luma_beta_offset_div2 and sh_nn_luma_tc2_offset_div2, and then bS2 is calculated and is transmitted to the DF unit 332. The same holds true for bS1 and bS2 for chrominance.

bS may be derived from the parameters for the DF and differences between the parameters for the DF and the parameters for the NN. For example, the bS derivation unit 331*b* may derive variables sliceLumaBetaOffsetDiv2 and sliceLumaTcOffsetDiv2, and use derived sliceLumaBetaOffsetDiv2 and sliceLumaTcOffsetDiv2 as beta1 and tC1 for the NN filter, as follows.

sliceLumaBetaOffsetDiv2=slice_luma_beta_offset_div2+
  beta_diff sliceTcBetaOffsetDiv2=slice_luma_*tc*_offset_div2+
  *tc*_diff Regarding this, by performing the following processing, beta1 and tC1 for the NN filter may be derived as syntax element values, using the method described above. In other words, the parameters for the NN may be derived from the parameters for the DF filter and differences between the parameters for the NN filter and the parameters for the DF.

sh_nn_luma_beta_offset_div2=slice_luma_beta_offset_div2+
  beta_diff sh_nn_luma_*tc*_offset_div2=slice_luma_*tc*_offset_div2+
  *tc*_diff As a matter of course, the parameters for the DF may be derived from the parameters for the NN filter and differences between the parameters for the NN filter and the parameters for the DF.

slice_luma_beta_offset_div2=sh_nn_beta_offset_div2+
  beta_diff slice_luma_*tc*_offset_div2=sh_nn_*tc*_offset_div2+
  *tc*_diff Parallel Configuration of NN Filter and ALF Filter The Adaptive loop filter (ALF) includes processing of deriving a class classification filtIdx by analyzing an image for each block and processing of selecting a filter coefficient and performing filtering processing using the obtained classification filtIdx.

The following will describe a configuration in which the same input image is used for class classification of the ALF and the NN filter, and ALF filtering processing is performed using an NN filter image.

Figure 24:
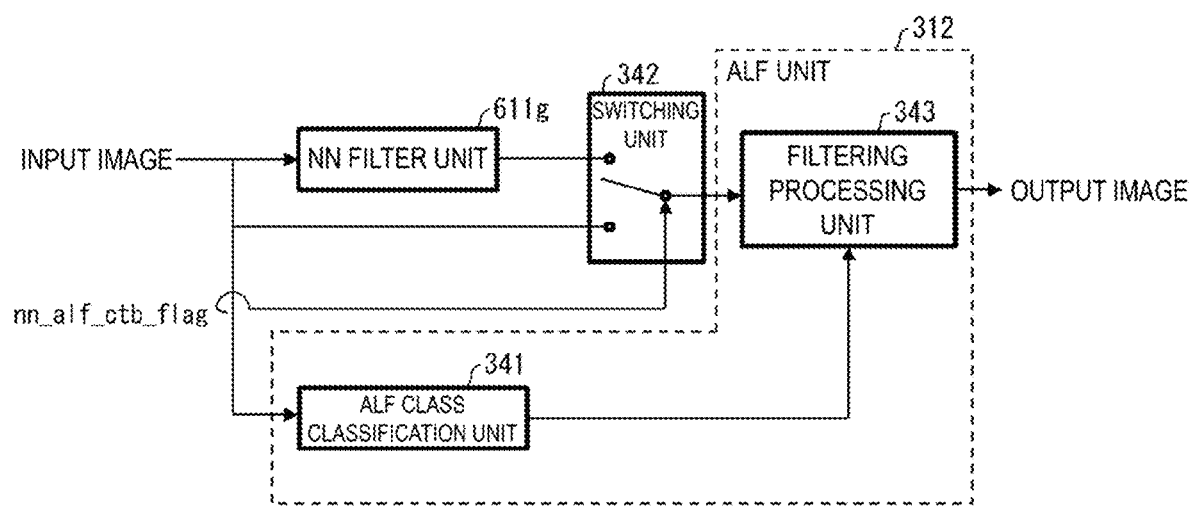
FIG. 24 is a diagram illustrating ALF class classification processing using an NN-unfiltered image and ALF class filtering processing using an NN filter image.

FIG. 24 is a diagram illustrating ALF class classification processing using the input image and ALF filtering processing using the NN filter image.

Using the input image recSamples, an NN filter unit 611*g* performs filtering processing using the NN model, and outputs the NN filter image outSamples.

An ALF class classification unit 341 outputs a class classification result filtIdx, using the input image recSamples.

A switching unit 342 outputs one of the NN filter image outSamples or the input image recSamples, depending on a value of nn_alf_ctb_flag.

nn_alf_ctb_flag is a variable having binary values of 0 or 1, and is a variable for determining an image to be output in the switching unit 342. nn_alf_ctb_flag is decoded in the CT information decoder 3021.

In each CTB, in a case that nn_alf_ctb_flag is 1, the switching unit 342 outputs the NN filter image, and in a case that nn_alf_ctb_flag is 0, the switching unit 342 outputs the input image. In other words, depending on the value of nn_alf_ctb_flag, the image to be input to a filtering processing unit 343 is switched between the NN filter image and the input image.

The filtering processing unit 343 outputs the image subjected to the ALF filtering processing, using the input image from the switching unit 342 and the classification filtIdx obtained from the ALF class classification unit 341. The image used by the filtering processing unit 343 is the NN filter image outSamples or the input image recSamples. The filtering processing unit 343 processes the image, and outputs the ALF-processed image.

Figure 25:
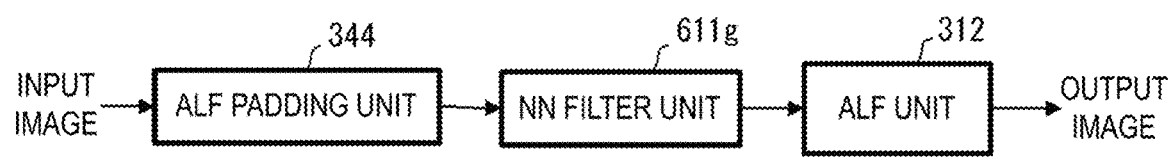
FIG. 25 is a diagram illustrating ALF padding processing.

FIG. 25 is a diagram illustrating ALF padding processing.

An ALF padding unit 344 outputs an image subjected to padding processing, using an input image.

The padding processing is processing for generating a reference image by padding neighboring pixels and thereby performing interpolation, without using pixels of pixels below virtual boundary, which is a line (a boundary along the horizontal direction indicated by Y-coordinates) virtually set in a target CTU, as reference pixels.

With respect to a certain CTU, the virtual boundary is, in a case of luminance, a column that is four pixels above the topmost column of the CTU below (vbOffset=4), and in a case of chrominance, a column that is two pixels above the topmost column of the CTU below (vbOffset=2).

The NN filter unit 611*g* performs processing, using the image subjected to the padding processing. The ALF unit 312 also performs processing, using the image of the NN filter unit 611*g* obtained by processing the image subjected to the padding processing as the input image, or the image subjected to the padding processing.

As described above, by performing processing taking account of the virtual boundary in both of the NN filter unit 611g and the ALF unit 312, there is an effect of reducing line memory. Particularly, it is preferable that processing using the same virtual boundary as the ALF unit 312 (the same processing of the ALF padding unit 344) be performed in the filters for performing processing prior to the ALF unit 312.

Configuration of Limiting Applicability of NN Filtering Processing Depending on Slice Shape The following will describe processing of enabling application of the NN filter only to a rectangular slice. Description will be given to an example of applying the NN filter in a configuration in which a slice having a rectangular shape (hereinafter, a rectangular slice) and a slice having a non-rectangular shape (hereinafter, a non-rectangular slice) are used as slices obtained by splitting a picture within a picture. For the slice, the CTU may be used as a unit, or 16×16 or 32×32 being smaller than the CTU may be used as a unit. Regarding whether the slice is a rectangular slice or a non-rectangular slice, pps_rect_slice_flag is decoded from the PPS of the coded data, and in a case that pps_rect_slice_flag=1, it is a rectangular slice. In a case of a rectangular slice, the width (here, pps_slice_width_in_tiles_minus1[i], which is the number in the horizontal direction in tile width units−1) and the height (here, pps_slice_height_in_tiles_minus1[i], which is the number in the vertical direction in tile height units−1) of the slice are decoded from the coded data. Data of the slice obtained by splitting a picture using the decoded width and height is decoded. In a case of pps_rect_slice_flag=0 (non-rectangular slice), the number of CTUs in the slice−1 (sh_num_tiles_in_slice_minus1) is decoded for each slice.

FIG. 26 is a diagram illustrating syntax related to flags for enabling application of the NN filter only in a case that the slice is rectangular.

In SYN0401, in a case that the flag pps_rect_slice_flag indicating whether the slice is rectangular which is decoded by the header decoder 3020 is 1 and sps_nn_enabled_flag being a flag indicating whether the NN filter is available which is decoded by the header decoder 3020 is 1, the header decoder 3020 decodes the flag sh_nn_enabled_flag indicating whether to use the NN filter.

In SYN0402, in a case that sh_nn_enabled_flag is 1 and there is a chrominance component in the input image, the header decoder 3020 decodes the flag sh_nn_enabled_flag indicating whether to use the NN filter for the chrominance component.

Application Example

The video coding apparatus 10 and the video decoding apparatus 30 described above can be utilized by being installed in various apparatuses performing transmission, reception, recording, and reconstruction of videos. Note that the video may be a natural video imaged by a camera or the like, or may be an artificial video (including CG and GUI) generated by a computer or the like.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

The invention claimed is:

1. A video decoding apparatus configured to generate a reconstructed image from a sum of a prediction image and a residual image, the video decoding apparatus comprising:
    an NN filter unit configured to perform filtering processing using a product-sum operation of two or more layers from luminance and chrominance signals; and
    a ccALF processing unit configured to derive a chrominance signal from the luminance and chrominance signals, wherein
    only one of the NN filter unit or the ccALF processing unit is exclusively adapted to the reconstructed image.

2. The video decoding apparatus according to claim 1, comprising:
    a header decoder configured to decode, from coded data, sh_nn_enabled_flag indicating whether processing of the NN filter unit is available in an SPS, a picture header, or a slice header, and sh_alf_cc_cb_enabled_flag and sh_alf_cc_cr_enabled_flag indicating whether processing of the ccALF processing unit is available, wherein
    in a case that the sh_nn_enabled_flag has a value indicating "available", the header decoder does not decode the sh_alf_cc_cb_enabled_flag and the sh_alf_cc_cr_enabled_flag from the coded data and sets the sh_alf_cc_cb_enabled_flag and the sh_alf_cc_cr_enabled_flag equal to a value indicating "unavailable", or
    in a case that the sh_alf_cc_cb_enabled_flag and the sh_alf_cc_cr_enabled_flag have the value indicating "available", the header decoder does not decode the sh_nn_enabled_flag from the coded data and sets the sh_nn_enabled_flag equal to the value indicating "unavailable".

3. The video decoding apparatus to claim 1, comprising:
    a header decoder configured to decode sh_nn_enabled_flag and sh_alf_cc_cb_enabled_flag and sh_alf_cc_cr_enabled_flag from coded data in a slice header;
    a CT information decoder 3021 configured to decode nn_ctb_scale_idx on a CTU basis;
    the NN filter unit configured to perform the filtering processing from the luminance and chrominance signals, depending on the nn_ctb_scale_idx; and
    the ccALF processing unit configured to derive the chrominance signal from the luminance and chrominance signals in a case that alf_ctb_cc_cb_flag and alf_ctb_cc_cr_flag are 1, wherein
    only one of the nn_ctb_scale_idx or the alf_ctb_cc_cb_flag and the alf_ctb_cc_cr_flag is decoded, and in a case that the one is 1 or greater, the other is set equal to 0.

4. The video decoding apparatus according to claim 1, wherein
    in a case that nn_ctb_scale_idx is 1 or greater, the CT information decoder 3021 does not decode alf_ctb_cc_cb_flag and alf_ctb_cc_cr_flag and derives 0.

5. The video decoding apparatus according to claim 1, wherein
    in a case that alf_ctb_cc_cb_flag and alf_ctb_cc_cr_flag are 1, the CT information decoder 3021 does not decode nn_ctb_scale_idx and derives 0.

6. A video decoding apparatus, comprising:
    a header decoder configured to decode sh_nn_enabled_flag and sh_alf_enabled_flag in a slice header;

a CT information decoder 3021 configured to decode nn_ctb_scale_idx from an NN flag on a CTU basis;

an NN filter unit configured to perform filtering processing from luminance and chrominance signals in a case that the nn_ctb_scale_idx is 1 or greater; and an ALF processing unit configured to switch and apply the filtering processing with edge strength in a case that alf_ctb_flag is 1, wherein only one of the nn_ctb_scale_idx or the alf_ctb_flag is decoded, and in a case that the one is 1 or greater, the other is 0.

7. A video coding apparatus configured to generate a reconstructed image from a sum of a prediction image and a residual image, the video coding apparatus comprising:

an NN filter unit configured to perform filtering processing using a product-sum operation of two or more layers from luminance and chrominance signals; and a ccALF processing unit configured to derive a chrominance signal from the luminance and chrominance signals, wherein only one of the NN filter unit or the ccALF processing unit is exclusively adapted to the reconstructed image.

* * * * *